United States Patent [19]

Hughes et al.

[11] Patent Number: 5,130,369

[45] Date of Patent: Jul. 14, 1992

[54] PROCESS FOR PREPARING FUNCTIONALIZED POLYMERIC COMPOSIIONS

[75] Inventors: Kathleen A. Hughes; Graham Swift, both of Blue Bell, Pa.

[73] Assignee: Rohm and Haas Company, Philadelphia, Pa.

[21] Appl. No.: 463,096

[22] Filed: Jan. 10, 1990

Related U.S. Application Data

[63] Continuation-in-part of Ser. No. 142,102, Jan. 11, 1988, abandoned.

[51] Int. Cl.$^5$ ............... C08G 61/02; C08L 65/00
[52] U.S. Cl. .................... 524/846; 524/832; 524/833; 526/210; 526/212; 526/271; 526/310; 526/312; 526/318.2; 526/318.3; 526/318.5; 526/320; 526/321; 526/328.5; 528/44; 528/59; 528/85; 528/272; 528/295.5; 528/297; 528/301; 528/306; 528/332; 528/366; 528/392; 528/393
[58] Field of Search ............... 526/75, 209, 211, 212, 526/214, 216, 317.1, 271, 318.5, 320, 328.5, 89, 220, 210, 312; 524/832, 833, 850, 852, 853, 854, 846; 528/392, 393, 85, 272, 295.5, 297, 301, 306, 332, 366

[56] References Cited

U.S. PATENT DOCUMENTS

Re. 23,514  6/1952  Voss ................. 526/217 X
2,820,777  1/1958  Suen et al. ................. 526/75
3,368,999  2/1968  Sekmakas et al. ............. 526/224 X
3,388,106  6/1968  Muskat ..................... 525/327.7
3,629,357  12/1971  Sekmakas ..................... 526/75

Primary Examiner—Fred Teskin
Attorney, Agent, or Firm—James G. Vouros

[57] ABSTRACT

Functionalized polymeric compositions are prepared by polymerizing ethylenically unsaturated functional monomer in a solvent including a reactive compound. The functional groups of the reactive compound and the functional monomer react during or subsequent to the polymerization of the functional monomer to provide functionalized polymeric composition. The reactive compound can be a hydroxy-terminated, poly(ethleneoxy)ated hydrophobe-bearing compound and the functional monomer can be a polymerizable carboxylated monomer, the functionalization in this case being a condensation. Removal of the water of condensation by azeotropic distillation drives the reaction to completion. The resulting high solids functionalized polymeric composition is soluble or dispersible in an appropriate solvent, and can be used as is, diluted with a solvent, or isolated. Polymeric compositions prepared according to the process can be used as builders in detergent compositions, as pigment dispersants in coating compositions, as tanning agents for leather, as associative thickeners and rheology modifiers for coatings compositions, and in a variety of other applications.

34 Claims, No Drawings

PROCESS FOR PREPARING FUNCTIONALIZED POLYMERIC COMPOSIIONS

This application is a continuation-in-part of U.S. application Ser. No. 142,102, filed Jan. 11, 1988, now abandoned.

BACKGROUND OF THE INVENTION

1. Field of the Invention

The present invention relates generally to a process for the preparation of polymers including side chains containing functional groups. More specifically, the invention relates to a high solids process for the preparation of addition polymers of ethylenically unsaturated monomers, the polymer including side chains having functional groups resulting from the reaction of two predecessor functional groups.

2. Brief Summary of the Prior Art

Except for the preparation of polyolefins, almost every polymerization reaction includes monomers having one or more functional groups. Everyday examples include carboxylic acid esters and amides, present in such frequently encountered vinyl monomers as ethyl acrylate and acrylamide. While the simplest of these functional group-containing monomers are prepared commercially by more complex reactions, each can be prepared by the reaction of two predecessor compounds. For example, while ethyl acrylate can be produced on a commercial scale by reaction of acetylene and carbon monoxide in an acidified ethanol solution containing nickel carbonyl, it can also be produced by the esterification of acrylic acid with ethanol. Generally, each of the two predecessor compounds bears its own unique functional group; for example, carboxyl in the case of acrylic acid and hydroxyl in the case of ethanol. the two predecessor compounds can be viewed as each including a predecessor functional group and their reaction product can be thought of as possessing a target functional group. A number of important monomers which have relatively complex side chains are synthesized by condensation of a simple ethylenically unsaturated precursor acid with an alcohol or amine. For example, the higher alkyl esters of acrylic and methacrylic acids are manufactured commercially by direct esterification or transesterification.

In some cases, depending on the specific monomers under consideration, it has been the practice in the art to employ a monomer containing one of the predecessor functional groups (a "first functional group") in a polymerization reaction, and to subsequently add a compound containing the other predecessor functional group (a "second functional group") to a solution or dispersion containing the polymer to form the target functional group For example, U.S. Pat. No. 4,559,156 discloses copolymers of ethylenically unsaturated monocarboxylic and dicarboxylic acids, and anhydrides such as maleic anhydride, which are partially esterified with an alkoxylated ($C_1$–$C_{18}$) alkanol.

Reacting the compound with the polymer to form the target functional group is sometimes referred to as "functionalizing" the polymer with the target functional group by those skilled in in the art.

Often when a polymer including the target functional group is to be prepared, both these synthetic pathways are at least in theory available. An example disclosing both routes is given in U.S. Pat. No. 4,524,123 (direct and indirect routes to hydroxy functional acrylic oligomers for reactive diluent use). The actual synthetic techniques selected depends on the properties of the specific system, such as the monomer reactivity ratios, the necessity of an ease of separation of the ultimate product, and the commercial availability of monomer containing the target functional group. In either case, a synthesis employing prior art techniques will include a polymerization reaction and a separate reaction between the first and second functional groups to form the target functional group.

While some vinyl monomers can be usefully polymerized in bulk for certain applications, in general vinyl addition polymerization reactions are carried out in a solvent for the monomers, in suspension or emulsion, or by some other technique which ensures that the polymeric product can be easily separated from the polymerization medium and subsequently processed. In solution polymerization, the solvent frequently plays several important roles. It solubilizes the monomers which otherwise might be incompatible, and thus expands the scope of achievable copolymerization. It may solubilize the product polymer, and serve as a carrier, diluent, or solvent for end-use products manufactured using the polymer, such as coatings compositions. The solvent may serve as a diluent for the polymerization reaction itself, making the polymerization reaction possible as a practical matter because excessive exotherms are avoided. The product polymer can be easily separated from the well chosen solvent, and the often undesired low molecular weight polymer fraction and the detritus of polymerization will remain in solution. Solution polymerization is often the technique of choice for preparing high quality product.

Despite its undeniable utility in many situations, the polymerization solvent has come to be regarded as a necessary evil, especially when it is a volatile organic compound. While its presence has always added to the raw material cost of the polymer, in recent times many useful and important solvents have been found to have undesirable effects on either the environment or occupational health or both. One alternative to use of solution polymerized polymers is reflected in the growth of water-based emulsion polymerization technology. Another approach has been the use of high solids techniques for minimizing the proportion of solvent present in the end product. In many cases, it is possible to substantially remove the organic solvent after solution polymerization by techniques such as distillation, spray drying, precipitation, and the like. Many common monomers such as acrylic esters, acrylamides, vinylidene chloride, and the like, are readily soluble in many solvents but react to form polymers which are insoluble and which precipitate from solution (precipitation polymerization).

High solids techniques often include a reactive diluent in the product formulation for post-polymerization reaction with the polymer, the diluent reacting with the polymer to form a solid in situ. For example, U.S. Pat. No. 4,672,080 discloses photocurable resin compositions prepared from urethane acrylate oligomer and including either trimethylolpropane triacrylate or tetrahydrofurfuryl-O-benzoyl-benzoate as a reactive diluent. Reactive diluents are widely used in epoxy compositions, for example U.S. Pat. No. 4,603,182 discloses an epoxy resin composition which may include divinyl benzene or diisopropenyl benzene as a reactive diluent. Similarly, European Patent Publication 119425 discloses a photopolymerizable epoxy resin composition which includes a photopolymerizable monoepoxide as reactive diluent. Alkyl glycidyl ethers are common reactive diluents in epoxy systems.

High solids acrylic coating compositions often include reactive diluents. For example, U.S. Pat. No. 4,677,168 discloses water borne high solids coating compositions employing a carbamate derivative as a reactive cosolvent or reactive diluent for the water-dispersable polymer used as a binder for the coating composition. Similiarly, U.S. Pat. No. 4,524,183 relates to high solids acrylic coating compositions formulated using a low molecular weight hydroxy-functional acrylic polymer as a reactive diluent. U.S. Pat. No. 4,515,835 discloses a high solids polymer thermosetting composition comprising a soft, low molecular weight hydroxy-functional addition polymer resin and a low molecular weight polyether reactive diluent having two or three aliphatic hydroxyl groups per molecule, the resin and the reactive diluent being dissolved in a common solvent. U.S. Pat. No. 4,477,534 relates to air-drying high solids coating compositions containing vinyl oxazoline esters as reactive diluents. U.S. Pat. No. 4,369,283 discloses high solids can coating compositions including acrylic, epoxy and aminoplast resins.

While reactive solvents and diluents are known for use in formulating high solids coating compositions and the like, they are, in most cases, mixed with the synthetic resin with which they are to react after the resin has been prepared by polymerization. One exception is the process disclosed in U.S. Pat. No. 4,144,220, in which an addition polymer is polymerized in the presence of a water insoluble polyhydric polymer, the polyhydric polymer serving as the polymerization solvent. An aminoplast resin is subsequently added in forming a coating composition curable at high temperature.

Another example of "reactive diluent" compositions is presented by resins which are partly but incompletely polymerized to form molding and impregnating resin compositions, such as B-stage epoxy resins and the like. Here the lower molecular weight portions of the incompletely polymerized resin can be thought of as a diluent for the higher molecular weight fraction. After a molding composition has been molded to the desired shape, heat is applied so that the "reactive diluent" and the high molecular weight resin react to form the solid, thermoset C-stage resin.

A related approach to high solids polymeric compositions has been the preparation of reactive oligomers, low molecular weight polymers with reactive end groups, such as reviewed in *Reactive Oligomers* (F. W. Harris and H. J. Spinelli, eds., American Chemical Society, Washington, D.C. 1985).

Despite the ongoing progress which has been made in reducing the level of organic solvents in high quality coating compositions by formulation of high solids coating compositions including reactive diluents, solvents continue to pose problems. Optimally, coating compositions should not emit solvents which are photochemically active or otherwise have an adverse impact on the environment or on health. In addition, organic solvents present a host of problems for the resin manufacturer. They are often flammable and toxic and must be accorded due respect in the manufacturing plant. They tend to be expensive as well. Solvents which have recently become available to reduce environmental and health concerns continue to be costly.

There is a strong need for polymerization techniques which minimize the amount of organic solvents required to produce high quality synthetic resin products. While substantial progress has been made in substituting aqueous emulsion processes for polymerization processes requiring organic solvents, the performance shown by solvent-polymerized resin products are still often superior to competitive water based products, especially with regard to water sensitivity.

SUMMARY OF THE INVENTION

The present invention provides a novel process for preparing a high solids polymeric composition which includes polymers having functionalized side chains and which is soluble or dispersible in an appropriate fluid medium. In this process at least one polymerizable ethylenically unsaturated functional monomer is dissolved in a solvent. The functional monomer includes at least one first functional group. For example, the functional monomer can be an ethylenically unsaturated monomer, such as acrylic acid, the first functional group being carboxyl. The solvent for the polymerization includes at least one reactive compound having at least one second functional group. The first and second functional groups are reactive with one and another. For example, the solvent can include an alkanol, the hydroxyl group being a second functional group reactive with the carboxyl group of the acrylic acid. The polymerizable functional monomer is polymerized in the presence of the reactive compound, optionally with other monomers such as monomers which do not include functional groups which are reactive with the second functional group of the reactive compound.

In another process step at least a predetermined portion of the first functional groups are reacted with the second functional group to provide the functionalized side chains. Depending on the relative rates of the polymerization reaction and the reaction between the first and second functional groups, substantial reaction between the first and second functional groups can occur before, during and/or after the polymerization reaction. In many cases, no substantial reaction of the first and second functional groups takes place before the polymerization of the polymerizable functional monomer has begun.

By use of the present process the isolation of the product of a polymerization reaction and subsequent functionalization of the product of the polymerization reaction by reaction with a reactive compound, such as are employed in prior art processes, and which would otherwise be necessary, are avoided. Similarly, the use of this process often permits the alternative synthetic route known in the art, namely preparation and isolation of the reaction product of the functional monomer and the reactive compound and subsequent polymerization of the reaction product, to be avoided. In some cases, neither prior art synthetic route is available, and the present process provides novel polymeric compositions previously unavailable.

In one embodiment of the present invention, the first and second functional groups react in a condensation reaction to form water or another product such as ammonia, as in an esterification or amidation reaction, and the solvent includes a nonreactive organic compound, such as toluene or methyl amyl ketone, which forms an azeotrope with water. The water of condensation is removed by azeotropic distillation, which simultaneously drives the condensation reaction towards completion and removes the organic solvent. If desired, the polymerized reaction product can be isolated by conventional means, such as precipitation and filtration. Alternatively, the polymerized reaction product can be diluted with a solvent of choice.

An important benefit of the process of the present invention is that new polymeric compositions can be produced by the present process. These new polymeric compositions could otherwise require the use of many solvent exchange steps and the development of multiple monomer intermediates, if prepared by conventional synthesis techniques, or may not be available at all through prior art synthetic techniques.

The polymeric compositions which can be prepared by the present process are useful in a wide variety of applications including the preparation of liquid and solid detergent compositions for a variety of uses including heavy duty detergent applications, as well as in specialty chemicals, coatings, and other applications.

In addition, the present process provides a unique route to functionalized polymeric compositions and has several important advantages over prior art techniques. Because the polymerization solvent includes a reactive compound, the amount of expensive, nonreactive organic solvents in the polymerization solvent can be reduced, often significantly, and sometimes can be omitted entirely. The number of process steps required to produce a desired product can also be reduced. For example, the often lengthy and expensive steps relating to separation of the polymer from the reaction mixture can be simplified. In processes in which the organic solvent can be omitted entirely, capital equipment otherwise required to keep the organic compounds in the polymerization kettle and out of the ambient atmosphere, as well as equipment otherwise necessary for containing and removing organic solvents, can be dispensed with entirely. Post-polymerization isolation and functionalization steps are omitted.

Further, the process of the present invention is extraordinarily versatile and encompasses a variety of reactive functional group pairs, such as carboxyl-alcohol, carboxyl-amine, epoxy-carboxyl, and the like.

DETAILED DESCRIPTION

In one aspect the process of the present invention combines elements of vinyl addition and condensation polymerization reactions. In prior art processes condensation or transesterification reactions are frequently used to prepare special "functional" monomers, the special functional group being borne by a reactive compound having a functional group which is reactive with another functional group borne by a polymerizable ethylenically unsaturated monomer. For example, the reactive compound may be a surface active compound having a hydrophobic portion covalently linked to a hydrophilic portion. The hydrophobic group can be considered to be a special functional group and the hydrophilic portion can be terminated by a functional group including active hydrogen, such as primary or secondary hydroxyl, primary or secondary amino, mercaptan or the like.

The prior art discloses two alternative routes for preparing a polymer having side chains derived from such a surfactant molecule. In the first route a carboxyl or carboxylic anhydride functional ethylenically unsaturated monomer is reacted with the surfactant by a condensation reaction to form a new monomer derived from the surfactant. The new "surfactant monomer" can be copolymerized with other monomers to form the desired polymeric composition. In the second prior art route, a copolymer including monomer having the reactive functional group is first prepared, the surfactant is dissolved in a solution containing the polymer, and the polymer is subsequently reacted with the surfactant to provide "surfactant" side chains on the polymer molecule.

The process of the present invention provides a third alternative. In one embodiment, as in the second prior art process, a monomer having a functional group which is reactive with active hydrogen, for example, a carboxylic acid such as methacrylic acid is initially mixed with other copolymerizable monomers to form a monomer mixture. However, rather than being dissolved in an inert, nonreactive solvent, the monomer is dissolved in a solvent including the surfactant at ambient temperature. A polymerization catalyst is added to the monomer solution. The catalyst for the reaction between the active hydrogen and the active hydrogen-reactive group can also be added to the monomer solution. For example, the acidity of the acrylate mixture can be adjusted to promote the condensation reaction. The temperature of the mixture is raised to simultaneously effect the vinyl addition polymerization and the esterification reaction. As water is a by-product of the esterification reaction, removal of the water of condensation by azeotropic distillation drives the condensation reaction toward completion. A high solids, functionalized and polymerized, reaction product results.

The process of the present invention provides a high solids polymeric copolymer including polymer which has functionalized side chains. Because the functionalization can take place during the polymerization process, the present process can be referred to as "in process functionalization" ("IPF"). when the functionalization is esterification, the process can be referred to as "in process esterification" ("IPE").

The polymeric composition produced by the process is soluble or dispersible in an appropriate fluid medium. For example, the product of the process can be a polymeric composition which is soluble in water, such as the product which can be formed by the process when acrylic acid is the functional monomer, the reactive compound is a lower alkanol such as methanol, and the polymerized acid residues are only partially esterified. Another example is a polymeric composition which is dispersible but not soluble in water. Such a polymeric composition can be prepared by employing a mixture of monofunctional and difunctional reactive compounds as the solvent for the preparative process. For example, a mixture of a monofunctional reactive compound such as a lower alkanol and a polyfunctional reactive compound such as a dihydric alcohol, for example, a polyethylene glycol, could be used, as when the functional monomer is acrylic acid. Depending on the relative proportion of the reactants and the other reaction conditions, a partially crosslinked, but water-dispersible, polymeric composition can result.

However, reaction conditions which produce polymer compositions which are neither soluble nor dispersible in an appropriate fluid medium are to be avoided. For example, employing too great a proportion of a multifunctional reactive compound can result in a reaction product which is neither soluble nor dispersible in an appropriate fluid medium. While such conditions can be of use in curing thermosetting polymeric binders in situ and in like applications, they are not to be used in the present process. However, the process of the present invention can be used to prepare polymeric compositions which can be subsequently cured to form insoluble, nondispersible materials.

Examples of appropriate fluid media for the polymeric composition include solvents for one or more of the monomers and/or reactive compounds from which the polymeric composition is prepared. For example, when acrylic acid is used as the functional monomer and methanol is used as the reactive compound, water, which is a solvent for both acrylic acid and methanol, is an appropriate fluid medium for dissolving or dispersing the polymeric composition.

Another type of dispersible polymeric composition which can be prepared by the process of the invention includes "associative" polymer molecules such as those which have both hydrophilic and mixed hydrophilic/-hydrophobic side chains, for example, carboxyl and alkyloxy- or alkaryloxy- poly(ethyleneoxy) or poly(ethyleneoxy)/poly(propylenoxy) (block copolymer) side chains. By hydrophobic interactions between hydrophobic blocks in the side chains of different polymer molecules, such associative polymers can form aggregates which are not covalently bonded. The average extent of association or aggregation can depend on the shear rate experienced by the composition in which the associative polymers are dispersed. Associative polymers are of particular value in preparing water-borne coating compositions. Shear rate-dependent thickening in these compositions can be advantageously modified by addition of associative polymers.

Unless otherwise indicated, as used herein, "dissolves" includes both the formation of a true solution and the formation of a dispersion. Thus when a polymerizable ethylenically unsaturated functional monomer is "dissolved" in a solvent it can either form a true solution or be dispersed in the solvent. Conventional means of dispersing functional monomers and otherwise incompatible solvents can be used, such as by the addition of a nonionic surfactant to facilitate the dispersion. Similarly, the solubility of marginally soluble monomers can be increased by use of cosolvents.

The solvent can include monomeric or polymeric species, or a mixture thereof. Examples of polymeric solvent include hydroxyl functional polyethers, such as mono-, di-,tri- and tetra-hydroxy functional polyoxypropylenes and polyoxyethylenes. The solvent can serve as matrix for the polymerization reaction, and must be fluid at the polymerization temperature. However, the solvent need not be fluid at temperatures other than the polymerization temperature, such as at ambient temperature.

The first and second functional groups carried respectively by the functional monomer and the reactive compound occur in pairs. Examples of ethylenically unsaturated polymerizable monomers which bear reactive functional groups and which can serve as "functional monomers" in the present process are given in *Functional Monomers* (R. H. Yocum and E. B. Nyquist, eds, Marcel Dekker, New York, 1974). As used herein "functional" monomer does not include monomers which are merely ethylenically unsaturated, such as the alkenes, nor does ethylenic unsaturation come within the class of functionality which is denoted by reference to "functional monomer." Often either member of a particular pair can be included in either a polymerizable monomer or a reactive compound.

For example, the carboxyl group and the hydroxyl group form such a pair. The first functional group can be carboxyl, the corresponding second functional group being hydroxyl, such as in the case of acrylic acid and butanol. Conversely, in this case, the first functional group can be hydroxyl while the second functional group is carboxylic, such as in the case of hydroxy-ethyl methacrylate and propionic acid. In general the first and second functional groups form reactive pairs; however, the constraints imposed by the polymerization reaction conditions may dictate that a particular member of a pair of functional groups be borne by the polymerizable monomer.

Examples of pairs of reactive first and second functional groups include carboxylic acid-primary alcohol, carboxylic acid secondary alcohol, carboxylic acid-primary amine, carboxylic acid-secondary amine, carboxylic acid-epoxy, carboxylic acid anhydride-primary alcohol, carboxylic acid anhydride-secondary alcohol, carboxylic acid anhydride-primary amine, carboxylic acid anhydride-secondary amine, isocyanato-primary hydroxyl, isocyanto-secondary hydroxyl, isocyanato-primary amino, isocyanato-secondary amino, epoxy-primary hydroxyl, epoxy-secondary hydroxyl, epoxy-primary amino, and epoxy-secondary amino. As shown by the above-mentioned pairs, the reactive first and second functional groups are not readily hydrolyzable and therefore, the reaction between the first and second functional groups is usually a condensation reaction and not a hydrolysis reaction.

Ethylenically unsaturated monomers in which the first functional group is a carboxyl group include acrylic acid, methacrylic acid, ethacrylic acid, alpha-chloroacrylic acid, alpha-vinylacrylic acid, crotonic acid, alpha-phenylacrylic acid, beta-acryloxypropionic acid, cinnamic acid, chlorocinnamic acid, beta-styrylacrylic acid, itaconic acid, maleic acid and fumaric acid. Examples of ethylenically unsaturated polymerizable carboxylic acid anhydride monomers are maleic anhydride, itaconic anhydride, acrylic anhydride, and methacrylic anhydride.

In the process of the present invention a carboxylic acid-functional monomer, which has a carboxyl group as a first functional group, can react with any of many second functional group-bearing compounds. For example, the carboxyl functional ethylenically unsaturated monomer can react with the primary alcohol compounds in an esterification reaction. Examples of primary alcohols which can be used include methanol, ethanol, n-propanol, and n-butanol. In addition to monohydric alcohols, dihydric alcohols, such as ethyleneglycol, diethyleneglycol, poly(oxyethylene) diol and poly(oxypropylene) diol as well as polyhydric alcohols, such as glycerol, can be used. Additional examples of hydroxy-functional compounds which can be used include halo alcohols such as fluoro alcohols, for example, 2-fluorophenol, 3-fluorophenol, 2-fluorobenzyl alcohol, 3-fluorobenzyl alcohol, 2-fluoroethanol, and fluorinated alkylpoly (oxyethylene)ethanols such as those available in the Fluorodad ® (trademark of Minnesota Mining and Manufacturing) series, including Fluorodad FC-170-C surfactant.

An especially important group of hydroxy-functional reactive compounds are hydroxy-functional surface active compounds such as the alkylaryloxypoly(ethyleneoxy)ethanols, for example, the octylphenoxypoly(ethyleneoxy)ethanols and nonylphenoxypoly(ethyleneoxy)ethanols available commercially in the Triton ® (trademark of Rohm and Haas Company) X and N series; block copolymers of poly(ethylene oxide) and poly(propylene oxide), such as those available commercially in the Pluronic ® (trademark of BASF Wyandotte) series; polyethyleneoxylated alkanols such as those available commercially in the Macol ® (trademark of Mazer Chemicals) CSA, LA, OA, and TD series; esters of polyethylene glycol and fatty acid, such as those available commercially in the Mapeg ® (trademark of Mazer Chemicals) series; polyethoxylated natural products such as polyethoxylated castor oil; polyethoxylated amines such as polyethoxylated coco amine, polyethoxylated tallow amine, polyethoxylated soya amine, polyethoxylated hydrogenated tallow amine, and the like; monoesters of glycerol such as glycerol monostearate, glycerol monooleate, glycerol monolaureate, and the like; and polyethoxylated derivatives of mono- and diesters of polyhydric alcohols such as glycerol, for example, polyethoxylated derivatives of a mixture of laurate and oleate esters of glycerol. The corresponding amine-functional reactive compounds, which react with carboxyl first functional group to yield amides, are also useful. Similarly, the corresponding mercapto-functional reactive compounds, which react with carboxyl first functional group to give thioesters, can also be used.

When the hydroxyl group is the first functional group and is borne by the polymerizable ethylenically unsaturated monomer, and carboxyl is the second functional group borne by the reactive compound, the first and second functional groups will also react to form an ester. Examples of hydroxy-functional polymerizable monomers include 2-hydroxyethyl acrylate, 2-hydroxypropyl acrylate, 2-hydroxyethyl methacrylate, 3-hydroxypropyl methacrylate, as well as monoacrylate and monomethacrylate derivatives of difunctional alcohols such as ethyleneglycol, diethyleneglycol, triethyleneglycol, propylene glycol, 1,4-butanediol, 1,5-pentanediol, poly(oxyethylene) diol, and the like. In this case, the second functional group is carboxyl and the reactive compound can be, for example, formic acid, acetic acid, trifluoroacetic acid, propionic acid, n-butyric acid, isobutyric acid, n-valeric acid, stearic acid, beta-chloroacetic acid, alpha-chloroacetic acid, fluorobenzoic acid, methoxyacetic acid, and cyanoacetic acid, benzoic acid, phenylacetic acid, or the like.

The reactive compound can itself include a site of ethylenic unsaturation, provided the site has low reactivity in vinyl polymerization reactions. For example, the reactive compound can be an unsaturated fatty acid such as oleic acid, linoleic acid, linolenic acid or the like.

A related functional monomer pair is made up of carboxylic acid anhydride and hydroxyl. Maleic anhydride is an example of a polymerizable ethylenically unsaturated carboxylic acid anhydride. Examples of reactive compounds having carboxylic acid anhydride functional groups include succinic anhydride, phthalic anhydride, and glutaric anhydride. In addition to the primary and secondary alcohols which can react with carboxylic acid functional groups, the carboxylic acid anhydride functional group can react with tertiary alcohols as well. Examples of reactive tertiary alkyl alcohols include tert-butyl alcohol.

In addition to the reaction with hydroxyl functional groups such as the terminal hydroxyl group in a "surfactant" alcohol, the carboxyl and carboxylic acid anhydride functional groups can each be paired with a number of other types of functional groups, such as amino and epoxy.

Examples of amino compounds which can be used as reactive compounds in the process of the present invention in conjunction with a carboxyl or carboxylic acid anhydride first functional group include alkyl amines such as methylamine, ethylamine, propylamine, n-butylamine, sec-butylamine, diethylamine, cyclohexylamine, ethylenediamine, and diethylenetriamine; aryl amines such as aniline; as well as amine derivatives such as ethoxylated amine and propoxylated amines sold under the "Jeffamine" trademark by Jefferson Chemical Company. The amine functional reactive compound can be used to react with carboxyl or carboxylic acid anhydride first functional groups to form an amide.

Other examples of polymerizable monomer including the hydroxy group as the first functional group include hydroxyalkyl itaconates such as 3-hydroxypropyl itaconate and di(2-hydroxyethyl) itaconate; hydroxyalkyl crotonates such as 3-chloro-2-hydroxypropyl crotonate and 2-hydroxymethyl-3-hydroxyethyl crotonate; acryloxypropionates such as 6-hydroxyhexyl acryloxypropionate and 2-hydroxyethyl acryloxypropionate; as well as polyethoxylated/polypropoxylated acrylates, methacrylates, itaconates, propionates, and the like.

The first functional group can also be a tertiary amino group and the corresponding second functional group can be epoxy. Examples of tertiary amino functional polymerizable ethylenically unsaturated monomers include N,N-dimethylaminoethyl methacrylate, N,N-diethylaminoacrylate, N,N-diethylaminoethyl methacrylate, N,N-diethylaminoethyl acrylate, N,N-diethylaminopropyl acrylate, and N,N-diethylaminopropyl methacrylate. Examples of epoxy functional reactive compounds are legion. Examples include water soluble and water dispersable epoxy resins, epoxy diluents such as butyl glycidyl ether, 2-ethylhexy glycidyl ether, t-butylphenyl glycidyl ether, neopentylglycol diglycidyl ether, and cyclohexane-dimethanol glycidyl ether, as well as alkyl epoxy compounds such as 1,2-epoxypropane and 1,2-epoxyethane, and aryl epoxy compounds such as p-ethylphenyl-2,3-epoxypropyl ether and p-methoxyphenyl 2,3-epoxypropyl ether.

Other examples of second functional groups reactive with tertiary amino first functional groups include halo as in alkyl halides, for example, ethyl chloride, methyl iodide, and n-propyl bromide, and sulfate, as in alkyl sulfates such as ethyl sulfate and n-propyl sulfate.

Yet another pair of functional groups are formed by the carboxylic ester functional group and the hydroxy functional group. In this case the carboxylic ester functional group may be either the first or second functional group. The first and second functional groups react in transesterification reaction. Examples of polymerizable ethylenically unsaturated esters include alkyl acrylates and methacrylates, such as methyl acrylate, ethyl acrylate, n-butyl acrylate, 2-ethylhexyl acrylate, cyclohexyl acrylate, isopropyl acrylate, isobutyl acrylate, n-amyl acrylate, n-propyl acrylate, methyl methacrylate, ethyl methacrylate, n-propyl methacrylate, n-butyl methacrylate, isopropyl methacrylate, n-octyl methacrylate, dodecyl methacrylate, neopentyl acrylate, n-tetradecyl acrylate n-tetradecyl methacrylate, isobutyl methacrylate, n-amyl methacrylate, n-hexyl methacrylate, isoamyl methacrylate, cyclopentyl methacrylate, n-decyl methacrylate, and the like; other acrylate and methacrylate esters such as lauryl methacrylate, 2-bromoethyl methacrylate, isobornyl methacrylate, phenyl methacrylate, 1-naphthyl methacrylate, benzyl methacrylate, 2-phenylethyl methacrylate, 3-methoxybutyl acrylate, 2-methoxybutyl methacrylate, and 2-n-butoxyethyl methacrylate; vinyl esters such as vinyl acetate, vinyl versatate, vinyl propionate, vinyl butyrate, vinyl isobutyrate, vinyl caproate, vinyl 2-ethylhexonate and vinyl decanoate; esters of other ethylenically unsaturated carboxylic acids such as monoalkyl, dialkyl and trialkyl esters of di- and tricarboxylic acids such as itaconic acid and the like. Examples of suitable esters include di(2-ethylhexyl) maleate, dimethyl fumarate, dimethyl itaconate, diethyl citraconate, trimethyl aconitate, diethyl mesaconate, monomethyl itaconate, mono n-butyl itaconate, di(2-ethylhexyl) itaconate and di-(2-chloroethyl) itaconate.

Another example of a functional group pair is formed by the isocyanate functional group and the hydroxy group Two related pairs of functional groups are the isocyanate functional group and amino functional group and the isocyanate functional group-water. In this case the isocyanate functional group can be a first functional group. Examples of ethylenically unsaturated polymerizable monomer having an isocyanate functional group includes isocyanatoethyl acrylate, isocyanatoethyl methacrylate, alpha, alpha-dimethyl meta isopropenyl benzyl isocyanate (available from American Cyanamid as m-TMI), and the reaction products of a hydroxyalkyl acrylate or hydroxyalkyl methacrylate and a diisocyanate such as isophorone diisocyanate.

Many examples of suitable isocyanate-functional reactive compounds exist, including monoisocyanate-functional compounds such as allyl and aryl mono isocyanates, for example, phenyl isocyanate, p-chlorophenyl isocyanate, 2,5-dichlorophenylisocyanate, 3,4-dichlorophenyl isocyanate, methyl isocyanate, ethyl isocyanate, n-propyl isocyanate, isopropyl isocyanate, and the like. Di-and multi-isocyanate functional compounds can also be used, including, 2,4-toluene diisocyanate, 4,-diphenylmethane diisocyanate, hexaethylene diisocyanate, dianisidine diisocyanate, m-exylene diisocyanate, and isophorone diisocyanate. If desired, the isocyanate functional group can be blocked at ambient temperature using a blocking compound such as epsiloncaprolactam, phenol, methyl ethyl ketoxime, or an active methylene compound.

Many other examples of functional group pairs will be apparent to those skilled in the art.

In addition to one or more reactive compounds having second functional groups, the solvent can include other compounds which are not substantially reacted with the first functional group. For example, conventional polymerization solvents can be included. Examples include hydrocarbon fractions, aromatic solvents such as toluene, exylene, cumene, and ethylbenzene, isoparaffinic hydrocarbons; ethers such as diethyl ether, diisopropyl ether, tetrahydrofuran and 1,4-dioxane; the dialkyl ethers of ethylene glycol and diethylene glycol such as ethylene glycol dimethy ether. High boiling solvents such as the mono- and di- lower alkyl (e.g. $C_1$-$C_4$) ethers of ethylene-glycol and diethylene glycol, such as ethylene glycol monoethyl ether, ethyleneglycol dimethyl ether, ethyleneglycol monobutyl ether, and diethyleneglycol monoethyl ether, are preferred when the polymeric product of the process is not to be separated from the reaction mixture, as for example, when the reaction product, dissolved in the high boiling solvent, can be used in formulating a coatings composition. Examples of coatings solvents which can be used include cyclohexanone, methyl isobutyl ketone, diacetone-alcohol, butyrolactone, N-methylpyrrolidone, isophorone, methyl isobutyl ketone, ethyl acetate and propylene carbonate. In addition to nonreactive cosolvents, the solvent can include polymerization initiator, catalyst for the reaction between the first and second functional groups, dispersants such as nonionic surfactants, chain transfer agents for regulating the growth of the polymer chain, and the like.

Polymerizing the at least one polymerizable monomer including at least one first functional group ("functional monomer") can be accomplished by conventional techniques. For example, when the functional monomer is a polymerizable ethylenically unsaturated monomer, addition polymerization techniques can be employed, such as free radical polymerization. In one presently preferred embodiment of the process of this invention, free radicals are generated in situ by thermal decomposition of a chemical initiator species.

Conventional free radical-generating polymerization initiators can be employed when ethylenically unsaturated monomers are to be polymerized by addition polymerization. For example, azo compounds such as 2,2'-azo-bis(isobutyronitrile), 2,2'-azo-bis(2,4-dimethylvaleronitrile), and 1-tert-butylazocyano cyclohexane; hydroperoxides such as hydrogen peroxide, tert-butyl hydroperoxide and cumene hydroperoxide; peroxides such as caprylyl peroxide, benzoyl peroxide, di-tert-butyl peroxide, ethyl 3,3'-di(t-butylperoxy) butyrate, ethyl 3,3'-di(t-amylperoxy) butyrate, and t-amylperoxy-2-ethyl hexanoate; peresters such as tert-butylperoxypivalate, tert-butylperoctoate, tert-butyl perphthalate, tert-butyl peracetate and tert-butyl perbenzoate can be used. Similarly, perphosphates and persulfates such as ammonium persulfate and potassium persulfate can be used.

Polymerization initiators can be used alone (thermal initiators) or as the oxidizing component of the redox system, which also includes a reducing component such as ascorbic acid, malic acid, oxalic acid, lactic acid, glycolic acid, thioglycolic acid, potassium metabisulfite, sodium thiosulfate, or sodium formaldehyde sulfoxylate. In a redox system, the reducing component is frequently referred to as an accelerator. The initiator and accelerator, commonly referred to as a catalyst, catalyst system, or redox system, can be used in a proportion of from about 0.001 to 5% each, based on the weight of monomers to be copolymerized. Examples of redox catalyst systems include hydrogen peroxide/Fe(II), tert-butylhydroperoxide/sodium formaldehyde sulfoxyate/Fe(II) and ammonium persulfate/sodium bisulfite/sodium hydrosulfite/Fe(II). Activators such as chloride or sulfate salts of cobalt, iron, nickel or copper can be used in small amounts, The polymerization temperature can be from ambient temperature up to the reflux temperature of the polymerization reaction mixture or higher, as when the reaction is conducted under an applied pressure. Preferably, the initiator and accelerator are selected to be soluble in the monomer solution or dispersion.

In the present process the functional monomer is soluble or dispersable in the solvent which includes the at least one reactive compound. Small amounts of surfactants which are not reactive with either the first or second functional group can be added to promote compatibility. For example, small amounts of nonionic surfactant can be added to promote the compatibility of non-functional and functional monomers and to increase the homogeneity of the polymerization product.

However, it is preferable to minimize the amount of nonreactive surfactant added.

If preferred, the polymerization initiator can be dissolved in solvent, in monomer, or in a monomer/solvent solution or dispersion and subsequently added gradually to the polymerization reactor. The initiator can also be gradually added separately but simultaneously with the monomer to the reactor. The molar ratio of initiator to monomer can be varied as the monomer and the initiator are fed to the reactor. Similarly, either the monomer or the initiator can be added in one or more batches. Polymerization can occur in two or more separate stages, for example, by changes in monomer composition. Polymerization can also be continuous, or it can be carried out in a mixed continuous/batch process, as when batches are sampled from a continuous reactor and the polymerization reaction and or the functionalization reaction is completed in the sampled batches. However, polymerization is begun with at least some functional monomer dissolved or dispersed in solvent including at least some reactive compound.

One or more chain transfer agents can be used to control the molecular weight of the product during polymerization. Examples of chain transfer agents which can be used include mercaptans, such as ethyl mercaptan, n-propyl mercaptan, n-butyl mercaptan, isobutyl mercaptan, tert-butyl mercaptan, n-amyl mercaptan, isoamyl mercaptan, tert-amyl mercaptan, n-hexyl mercaptan, cycloehexyl mercaptan, n-octyl mercaptan, n-decyl mercaptan, n-dodecyl mercaptan, 2-hydroxyethyl mercaptan, 3-mercaptopropionic acid, methyl 3-mercaptopropionate, ethyl 3-mercaptopropionate, mercaptoacetic acid, 4-mercaptobutyric acid, ethyl 4-mercaptobutyrate, methyl mercaptoacetate, ethyl 3-mercaptoisobutyrate; aryl mercaptans such as thiophenol and thiocresol; polymercaptans such as trimethylolpropane trimercaptan; halogen compounds such as carbon tetrachloride, tetrachloroethylene, trichlorobromoethane; and the like.

Some primary alkanols, for example, ethanol, are not sufficiently effective as chain transfer agents to be employed as such in the process, although others, such as benzyl alcohol and the mono- lower (e.g. $C_1$–$C_4$)) alkyl ethers of dihydroxy- compounds such as ethylene glycol and diethyleneglycol can be so used. Further, some secondary alcohols such as isopropanol can be used. On the other hand, alkanols can also be used as reactive compounds when the first functional group is reactive with the hydroxy functional group.

The amount and type of chain transfer agent employed depends upon the application for which the product of the process is to be used, the polymer molecular weight desired, the presence and amount of nonreactive components of the solvent, the proportion of the reactive compound used relative to the total monomer, and the like. The proportion and type of initiator and chain transfer agent are selected to give a polymerization product having a desired average molecular weight. The polymer average molecular weight ranges from relatively low as in the case of oligomers to relatively high, depending on the end use of the application for the product of the process. For example, when the product of the process is to be used subsequently in formulating reactive oligomer compositions, conditions which favor relatively low average molecular weight polymers can be adopted. Conversely, when the product of the process to be used, for example, as a thermoplastic molding compound for an article to be used under adverse environmental conditions, a high average molecular weight is generally favored. Chain transfer agent can be gradually added to the polymerization reactor, either neat or dissolved in monomer itself. The addition of the chain transfer agent can be adapted to maintain the average molecular weight of the polymer product within a predetermined range.

Chaser "catalyst" (initiator) can be added to the reactor toward the end of the polymerization reaction to reduce residual monomer concentration to an acceptable level, such as less than about 0.1% by weight of the polymer. For example, a polyoxyketal initiator such as ethyl 3,3-di(t-butylperoxy) butyrate can be used.

In general it is preferable to avoid or minimize the use of added species which are neither polymerizable nor reactive with the at least one first functional group. In traditional solution and percipitation polymerization techniques, small molecular weight species such as surfactants dissolved or dispersed in the solvent are separated with the solvent from the polymerization product by filtration or related physical separation techniques. However, in the present process residual solvent is preferably removed by drying or distillation, as if by azeotropic distillation, and nonreactive additives can be retained in the product of the process. This retention can be undesirable if the retained species adversely effects the processing, application or stability characteristics of the product of the process. This may occur, for example, if the retained species increases the water sensitivity of the product, or if the species is subsequently oxidized to a chromophore which adds an undesired color to the product. While nonreactive additives can often be removed by subsequent extractive process steps, such additional steps are not consistent with the goal of providing a simple, low cost process and are preferably avoided by minimizing the number of additives and the proportion of each additive used.

When the first and second functional groups react in a condensation reaction to form water as a by-product, one or more organic compounds can be included in the solvent such that the organic compound and water form an azeotrope. The water of condensation can then be removed from the reaction mixture by azeotropic distillation. Distillation of ternaryazeotropes is well known in the art relating to the preparation alkyl acrylates and methacrylates. Suitable organic compounds for use in the present process include aromatic compounds known to form binary azeotropes with water including hydrocarbons such as toluene and benzene, substituted hydrocarbons such as ethylene chloride and propylene chloride, alcohols such as n-hexyl alcohol, n-heptyl alcohol, n-octyl alcohol, and benzyl alcohol, ethers such as diisobutyl ether, diisoamyl ether, diphenyl ether, anisole, resorcinol, diethyl ether; esters such as n-butyl formate, benzyl acetate, ethyl butyrate, methyl isobutyrate, ethyl isovalerate, ethyl caproate, methyl benzoate, and ethyl phenyl acetate; acids such as propionic acid; ketones such as methyl ethyl ketone, mesityl oxide, and diacetonealcohol, aldehydes such as furfural and butyraldehyde; and amines such as pyridine.

The azeotrope-forming organic compound can be selected to be not substantially reactive with the first functional group. In some cases, the reactive compound can also serve as an azeotrope forming organic compound, as when the first functional group is carboxyl and the second is hydroxyl. Many alcohols are known to form binary azeotropes with water, such as ethanol, isopropanol, n-butanol, n-amyl alcohol and tert-amyl alcohol. Such an alcohol can be included in the solvent as a reactive compound for reaction with the first functional group to form an ester. For example, when the functional monomer is acrylic acid, isopropanol can be used as the reactive compound. The initiator in this case is selected to generate free radicals at the azeotropic distillation temperature of water/isopropanol (80.4° C.).

The functional monomer employed in the present process can include only a single first functional group, such as in the case of polymerizable monoethylenically unsaturated monocarboxylic acid monomers, for example, acrylic acid and methacrylic acid. Alternatively, a functional monomer can include more than one first functional group. Polymerizable ethylenically unsaturated dicarboxylic acid monomers such as maleic acid, itaconic acid, and the like, are examples of functional monomers containing more than one first functional group. When more than one first functional group is included in a functional monomer the first functional group can be the same or different. If desired, a single functional monomer can be used in the present process. Alternatively, two or more functional monomers can be employed in the process. The two or more functional monomers can include the same first functional group, as in the case of the mixture of ethylenically unsaturated monocarboxylic acids, or the two or more functional monomers can include different first functional groups.

If desired, "nonfunctional" monomers can be copolymerized with the functional monomer; the "nonfunctional" monomer being nonfunctional in this sense that it is not substantially reactive with the reactive compound included in the solvent. Thus, whether a particular monomer is a functional or nonfunctional monomer depends on the nature of the reactive compound and the second functional group. For example, when the reactive monomer is a monoethylenically unsaturated carboxylic acid and the reactive compound is a surfactant alcohol, polymerizable ethylenically unsaturated acrylic and methacrylic acid esters which are not substantially reactive with the surfactant alcohol can be employed as nonfunctional monomer, it being understood that the reaction conditions selected favor esterification rather than transesterification. Examples of polymerizable ethylenically unsaturated esters are given above. Additional polymerizable ethylenically unsaturated monomers which can be used as nonfunctional monomers include styrene, alpha-methyl styrene, vinyl toluene, methyl alpha-cyanoacrylate, methyl vinyl ether, isopropyl vinyl ether, n-butyl vinyl ether, isobutyl vinyl ether, tert-butyl vinyl ether, 2-ethylhexyl vinyl ether, 1,4-butanediol divinyl ether, diethyleneglycol divinyl ether, vinylidene chloride, vinyl chloride, vinyl fluoride, vinylidene fluoride, sodium vinyl sulfonate, butyl vinyl sulfonate, phenyl vinyl sulfone, methyl vinyl sulfone, N-vinyl pyrrolidinone, N-vinyl oxazolidinone, triallyl cyanurate, triallyl isocyanurate, and the like.

In the present process, at least a predetermined proportion of the at least one first functional groups are preferably reacted with the at least one second functional group. For example, given the objective of preparing a polyacrylic acid having at least ten mole percent of the carboxyl residues functionalized with polyether side chains, the proportions of the reactants and the reaction conditions must be selected to achieve their objective. In this case, the functional monomer, acrylic acid and the reactive compound, for example, polyethylene glycol, can be provided in about a ten to one molar ratio in the reactor, and the water of condensation can be removed by azeotropic distillation with toluene to drive the esterification to completion. Here, the predetermined proportion of first functional groups which are reacted with the second functional group of the reactive compound is ten percent.

The relative rates of reaction of the polymerization and the reaction between the first and second functional groups determine whether there is substantial polymerization before there is substantial reaction between the reactive compound and the monomer bearing the first functional group, whether there is substantial reaction between the first and second functional groups before there is substantial polymerization, or whether the products of the two reactions are produced in comparable amounts simultaneously. When the first functional group is highly reactive with the second functional group, such as when the first functional group is isocyanato and the second functional group is amino (or vice versa), the reaction between the first and second functional groups can produce a substantial amount of product which can be subsequently polymerized. Additional examples of highly reactive functional group pairs which can react to give polymerizable condensation products are well known in the art.

In many other cases the polymerization reaction will produce a substantial amount of polymeric product before there is substantial reaction between the first functional group of the functional monomer and the second functional group of the reactive compounds. Often the relative rate of reaction of the polymerization and the reaction between the first and second functional groups can be varied by choice of catalyst for either reaction, or by selection of temperature or other process variables. In general, during at least some period in the process, the polymerization and the reaction of the first and second functional groups are occurring simultaneously.

In some cases the process is preferably carried out such that no substantial reaction of the at least one first functional group and the at least one second functional group occur before the polymerization of the polymerizable functional monomer has begun. More preferably under some circumstances, the predetermined proportion of the at least one first functional group which is reacted with the at least one second functional group is a substantial fraction of the first functional groups. For example, when the polymerizablity of the functional monomer is substantially diminished by reaction with the reactive compound, it may be desirable to adjust reaction conditions so that the functional monomer tends to become polymerized before it reacts with the reactive monomer. Conversely, when the reactivity of the first functional group with respect to the second functional group is substantially diminished by polymerization of the functional monomer, it may be desirable to adjust the reaction conditions to favor reaction between the first functional group and the second functional group over polymerization of the functional monomer.

While substantially all the first functional group can react with the second functional group in some cases, often it will be desirable to limit the extent to which the first functional groups react with the second functional groups, as, for example, by adjusting the molar ratio of the first to second functional groups. For example, when the first functional group is carboxylic and the functional monomer is an ethylenically unsaturated monocarboxylic acid such as acrylic acid and the reactive compound is a surfactant alcohol or mercaptan it is often desirable to limit the molar ratio of the surfactant alcohol or mercaptan to the ethylenically unsaturated monocarboxylic acid to a predetermined fraction substantially less than unity so that the polymeric reaction product of the process includes both carboxyl sidechains and surfactant esters or mercapto esters sidechains.

The process can often be carried out in a manner such that substantial reaction of the reactive compound with the functional monomer is avoided before the onset of polymerization. While some incidental reaction can often be tolerated, it may be desired that reaction prior to the onset of polymerization be avoided so that the reactive compound can continue to serve as a solvent for the monomer, at least until polymerization is initiated. A number of means exist to accomplish this result. For example, when the rate of reaction between the first and second functional groups is increased by catalysis, the catalyst for the reaction between the first and second functional groups can be added to the reaction mixture after the polymerization reaction has begun. For example, aliphatic isocyanate groups can be incorporated in the polymer by inclusion of n-isopropenyl-alpha, alpha-dimethylbenzyl isocyanate in the monomer mixture, and the reactive compound can be a primary or secondary alkanol. The reaction of the isocyanate first functional group with the hydroxy second functional group can be initiated after polymerization has begun, or even after it has been substantially completed, by addition of a catalyst, such as a dialkyl tin dilaurate, to the reactor. When the reaction between the first and second functional group is an equilibrium type reaction under the polymerization conditions, such as an esterification or amidation reaction, substantial reaction of the first and second functional groups may not occur absent removal of one of the species produced in the reaction, such as water in the case of esterification and amidation. Even in cases in which substantial reaction of the first and second functional groups occurs in an equilibrium reaction under the polymerization conditions, removal of a reaction product such as water during or subsequent to the polymerization will tend to drive the reaction between the first and second functional groups to completion.

The polymeric product of the process of the present invention can be represented, in general, by the formula:

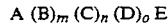   (I)

wherein

A is the residue of a polymerization initiator or chain transfer agent;

B is the residue of a polymerizable ethylenically unsaturated monomer having at least one first functional group;

C is the residue of the reaction product of a polymerizable ethylenically unsaturated monomer having at least one first functional group and at least one reactive compound having at least one second functional group, the at least one first functional group being reactive with the at least one second functional group;

D is the residue of a polymerizable ethylenically unsaturated monomer which lacks a first functional group; and E is the residue of a polymerizable ethylenically unsaturated monomer.

In formula (I) the subscript n is a positive integer and m and o are non-negative integers. It is understood that the B, C and D residues can be arranged in any sequence.

The nature of the A residue depends on the initiator and chain transfer agent used in the polymerization process. For example when an alkyl mercaptan, such as n-dodecyl mercaptan, is used as a chain transfer agent, A can be an alkyl sulfide residue, such as $n-C_{12}H_{25}S-$. Similarly, when an aryl mercaptan is employed as a chain transfer agent, A can be an aryl sulfide residue. The A residue can be a carboxylic acid-functional sulfide residue when a mercapto carboxylic acid is used as a chain transfer agent. When a mercapto carboxylic ester is used as a chain transfer agent, the A residue can be an ester sulfide residue. Post polymerization oxidation of the sulfur in the A residue can result in sulfoxide and/or sulfone groups in A residues. If an alcohol, such as isopropanol or benzyl alcohol, is used as a chain transfer agent, then the A residue can include alcohol and/or lactone groups. When cumene is used as a chain transfer agent, the A residue can be an alkyl aromatic group.

When a chain transfer agent is not used, the A residue will reflect the choice of initiator. For example, if a perphosphate initiator is used, the A residue can include a phosphate group. Similarly, if a persulfate initiator is used, the A residue can include a sulfate group. If hydrogen peroxide is used as initiator, the A residue can include a hydroxyl group. Use of t-butyl peresters as initiators can result in A residues having ether or alkyl groups derived therefrom.

B and C are closely related: B represents the class of residues resulting from polymerization of functional monomer which has not reacted with reactive compound either before polymerization (that is, as monomer) or after polymerization. C represents functional monomer residues which have reacted with reactive compound. It is possible that m be zero. In this case, all the functional monomer has reacted with reactive compound and consequently there are no residues in the polymer which bear a first functional group. For example, when the first functional group is carboxyl, the reactive compound is an alcohol present in substantial excess, and the esterification reaction is driven to completion by azeotropic removal of the water of condensation, substantially all the first functional (acid) groups will have been esterified, and substantially all the product polymer molecules will have m equal to zero. On the other hand, depending on the application in which the product polymer is to be used, it can be tolerable, desirable or even necessary to provide polymer with first functional groups (i.e., m>zero) such as carboxyl groups. In such a case the first functional groups can be provided, for example, by selecting a molar ratio of functional monomer to reactive compound greater than one, and driving the reaction between the first functional groups and second functional groups to completion. Similarly, the extent of reaction between the first and second functional groups can be limited so that the first functional groups do not react completely with second functional groups, even should the second functional groups be present in excess in the reaction mixture. For example, when the first functional group is carboxyl and the second hydroxyl, the condensation reaction can be allowed to achieve an equilibrium at a point short of substantial completion by incomplete removal of the water of condensation. Generally, as it is sought to react a predetermined proportion of the first functional groups with the second functional groups, the former method is preferable, as it is less difficult to control the extent of the reaction in that case.

The D residue in formula (I) represents the residue of a "nonfunctional" monomer. The E residue is the terminal residue in the polymer chain. Unlike the B, C and D residues, which are bivalent, the E residue, like the A residue, is univalent. The E residue can be derived from functional monomer, like the B and C residue, or it can be derived from nonfunctional monomer like the D residue. The E residue can include a residue of reactive compound as does the C residue. In addition, the structure of the E residue can reflect the "history" of the chain termination process. For example, the structure of the E residue in a chain terminated by disproportionation can differ from the structure of the E residue in a chain terminated by radical transfer.

The polymeric compositions prepared according to the process of the present invention are useful in a wide variety of applications. The polymeric compositions so prepared are particularly useful as builder in detergent compositions, especially liquid detergent compositions, such as disclosed in copending U.S. patent application Ser. No. 142,751, now U.S. Pat. No. 4,797,711 of Graham Swift, Kathleen Hughes, Charles E. Jones, and David Amick, commonly assigned herewith and hereby incorporated by reference. In addition, the process can be used to prepare polymeric dispersants such as pigment dispersants for various coatings applications, suspending agents for suspending particulate materials in fluid media, and the like. In addition, the process can be used to prepare solution-grade polymeric binders for a variety of coatings applications, such as for architectural coatings, marine coatings, paper coatings, can coatings, binders and coatings for textile and nonwoven material, roll coatings, and the like. In addition, the process of the present invention provides unexpectedly superior tanning agents for leather manufacture.

The following examples will aid those skilled in the are in understanding the present invention; however, the present invention is in no way limited thereby. In the following examples, percentage composition is by weight. The following abbreviations are used in the examples which follow:

| AA | acrylic acid |
|---|---|
| EA | ethyl acrylate |
| EO | ethylene oxide |
| n-DDM | n-dodecylmercaptan |
| IPA | isopropanol |
| MAA | methacrylic acid |
| MAAn | methacrylic acid anhydride |
| MAc | maleic acid |
| MAK | methyl amyl ketone |
| MAn | maleic anhydride |
| NaPS | sodium persulfate |
| PEG | polyethylene glycol |
| Sty | styrene |
| TGA | thioglycolic acid (95%) |
| 3-MPA | 3-mercaptopropionic acid |

EXAMPLE 1

In a reactor provided with a stirrer and a reflux trap 72 parts by weight toluene and 233 parts by weight Macol (trademark of Mazer Chemicals) CSA 20 [($C_{16-18}$)alkoxy(ethyleneoxy)$_{19}$ethanol] was heated at reflux until all the water was removed. Thereafter, a mixture of 100 parts acrylic acid and 2 parts by weight di-t-butyl peroxide initiator, and a mixture of 19 parts toluene and 10.5 parts 3-mercaptopropionic acid were metered in over 2 hours, with the reactor contents kept at reflux. Toluene was removed as needed to keep the reflux temperature at about 140° C. After the polymerization was complete, the reaction mixture was kept at reflux until esterification was complete. The extent of esterification was monitored by the amount of water removed.

Thereafter, the reaction mixture was heated under vacuum until all the toluene has been removed. The resulting copolymer was recovered from the reactor mixture at 100% solids.

EXAMPLE 2

The process of Example 1 was repeated, except that an initial charge of 22 parts of toluene was present in the reactor, tert-butyl peroctoate was used as the initiator, and 20 parts of 3-mercaptopropionic acid was used as the chain transfer agent (no toluene).

EXAMPLE 3

A 1 liter, 4-neck, round bottom flask was equipped with a mechanical stirrer, an addition funnel, a nitrogen purge, a thermometer, a monomer addition line, a Dean-Stark trap, and a condenser. To the flask was charged 50 g (.045 moles) of surfactant alcohol (Macol CSA-20 Mazer Chemical), 300 g (0.0375 moles) of (Carbowax ® E-8000 Union Carbide Corp.) polyethylene glycol (molecular weight=about 8000), and 180 mL of methyl amyl ketone (MAK). The flask contents were heated to reflux to azeotropically dry the alcohols. After water evolution had ceased the alcohols were cooled to 135° C. while the Dean-Stark trap was emptied of solvent and water. Once at 135° C. a solution of 77 g (0.9 moles) of methacrylic acid, 140 g (1.35 moles) of styrene, and 1.2 g of di-t-butyl peroxide was fed into the flask through the monomer addition line. Concurrently a solution of 9.1 g (0.045 moles) of n-DDM in 40 mL of MAK was fed to the flask through the addition funnel. The two additions occurred over 145 minutes. The solution was then held at 135° C. for 30 minutes and then heated to reflux to complete the esterification. After 30 minutes of heating 0.5 mL of water had been collected in the Dean-Stark trap and 40 mL of MAK was removed to cause the solution to reflux at a higher temperature. The flask was heated for an additional 2.5 hours until no more water was evolving (total water collected was approximately 3 mL) from the solution. The reaction flask contents were evaporated under vacuum to remove any volatile material yielding a light yellow viscous liquid which solidified on cooling. The monomer composition and physical properties of the resulting copolymer are given in Table 1.

EXAMPLES 4–7

Using the process of Example 3, Examples 4–7 were polymerized from monomer having the composition given in Table 1. Several physical properties of the resulting crosslinked copolymer compositions are also given in Table 1. The data in Table 1 shows the effects of increasing the level of surfactant monomer at a constant molar ratio of pblyethylene glycol to surfactant-functional addition polymer on the physical properties of the resulting crosslinked copolymer compositions.

TABLE 1

|  | Example | | | | |
|---|---|---|---|---|---|
|  | 3 | 4 | 5 | 6 | 7 |
| *Monomer Composition* | | | | | |
| styrene[1] | 140 g (.60) | 127 g (.54) | 122 g (.52) | 122 g (.54) | 122 g (.53) |
| MAA[1] | 77 g (.38) | 89 g (.43) | 93 g (.44) | 93 g (.42) | 93 g (.08) |
| surfactant alcohol[1,2] | 50 g (.02) | 76 g (.03) | 101 g (.04) | 151 g (.06) | 202 g (.08) |
| Crosslinker[3] | 300 g | 300 g | 300 g | 300 g | 300 g |
| n-DDM | 9.1 g | 9.1 g | 9.1 g | 9.1 g | 9.1 g |
| *Polymer Properties* | | | | | |
| Ratio of Crosslinker/Polymer | 5 E-8000/ 6 chains | 5 E-8000/ 6 chains | 5 E-8000/ 6 chains | 5 E-8000/ 6 chains | 5 E-8000/ 6 chains |
| Dp[4] | 50 | 50 | 50 | 50 | 50 |
| Sol. Visc.[5] as $NH_4^+$ salt | 304,000 cps | 100 cps | 18,000 cps | 28,000 cps | 50,000 cps |
| Total Solids[6] (by weight) | 9.8% | 7.8% | 7.6% | 7.4% | 6.5% |

[1]Composition given as weight of monomer added to reaction flask and calculated mole fraction of monomer in polymer.
[2]Macol ® (trademark of Mazer Chemical Co.) CS-20.
[3]Carbowax ® (trademark of Union Carbide Corp. for methoxy polyethyleneglycol) E-8000 (molecular weight about 8000).
[4]Calculated average degree of polymerization.
[5]Solution viscosity of ammonium salt of polymer measured at pH = 9.0, using a Brookfield LVT viscometer, spindle #1, at a shear rate of 12 rpm.
[6]Concentration at which viscosity was measured.

EXAMPLE 8

A 1 liter, 4-neck, round bottom flask was equipped with a mechanical stirrer, an addition funnel, a nitrogen purge, a thermometer, a monomer addition line, a Dean-Stark trap, and a condenser. To the flask was charged 157 g (.14 moles) of surfactant alcohol (Macol CSA-20 Mazer Chemical), and 80 mL of methyl amyl ketone (MAK). The flask contents were heated to reflux to azeotropically dry the alcohol. After water evolution had ceased the alcohol was cooled to 135 ° C. while the Dean-Stark trap was emptied of solvent and water. Once at 135 ° C. a solution of 120 g (1.4 moles) of methacrylic acid, 36 g (.35 moles) of styrene, and 2.0 g of di-t-butyl peroxide was fed into the flask through the monomer addition line. Concurrently a solution of 14 g (.07 moles) of n-DDM in 35 mL of MAK was fed to the flask through the addition funnel. The two additions occurred over 80 minutes. The solution was then held at 135 ° C. for 30 minutes and then heated to reflux to complete the esterification. The flask was heated for an additional 3.0 hours until no more water was evolving (total water collected was 9 mL) from the solution. The reaction flask contents were evaporated under vacuum to remove any volatile material yielding a light yellow viscous liquid which solidified on cooling. The monomer composition and physical properties of the resulting copolymer are given in Table 2.

EXAMPLES 9–12

The process of Example 8 was repeated, except that a polyethylene glycol was included with the initial charge of Macol ® CSA-20 as shown in Table 2, to give the crosslinked copolymer compositions of Examples 9–12. Several physical properties of the crosslinked copolymer of Examples 9–12 are also given in Table 2. The data given in Table 2 show the effects of varying the molecular weight (chain length) of the crosslinking polymer (polyethylene glycol) on the physical properties of the resulting crosslinked copolymer compositions.

TABLE 2

|  | Example | | | | |
|---|---|---|---|---|---|
|  | 8 | 9 | 10 | 11 | 12 |
| *Monomer Composition[1]* | | | | | |
| styrene | 36 g (.20) | 36 g (.20) | 36 g (.20) | 36 g (.20) | 36 g (.20) |
| MAA | 120 g (.72) | 120 g (.72) | 120 g (.72) | 120 g (.72) | 120 g (.72) |
| surfactant[2] alcohol | 157 g (.08) | 157 g (.08) | 157 g (.08) | 157 g (.08) | 157 g (.08) |
| crosslinker[3] type and level | none | pEO 7 g (MW 200) | pEO 7 g (MW 2000) | pEO 10.6 g (MW 200) | pEO 11.7 g (MW 200) |
| n-DDM | 14 g | 14 g | 14 g | 14 g | 14 g |
| *Polymer Properties* | | | | | |
| Ratio of Crosslinker/Polymer | none | 1 EO-200/ 2 chains | 2 EO-2000/ 2 chains | 3 EO-200/ 4 chains | 5 EO-200/ 6 chains |
| Dp[4] | 25 | 25 | 25 | 25 | 25 |
| Sol. Visc.[5] as $NH_4^+$ salt | 18,000 cps (30 rpm) | 133,200 cps (3 rpm) | 6,240 cps (30 rpm) | 193,200 cps (1.5 rpm) | 73,000 cps (6 rpm) |

TABLE 2-continued

| | Example | | | | |
|---|---|---|---|---|---|
| | 8 | 9 | 10 | 11 | 12 |
| Total Solids (w/w)[6] | 8.1% | 7.0% | 7.8% | 8.0% | 7.8% |

[1]Composition given as weight of monomer added to reaction flask and calculated mole fraction of monomer in polymer.
[2]Macol ® (trademark of Mazer Chemical Co.) CS-20.
[3]Cabowax ® E-200, E-2000 and E-8000 have average molecular weights of about 200, 2000 and 8000 respectively.
[4]Calculated average degree of polymerization.
[5]Solution viscosity of ammonium salt of polymer measured at pH = 9.0, using a Brookfield LVT viscometer, spindle #4, at the shear rate of indicated in parentheses.
[6]Concentration at which viscosity was measured.

EXAMPLE 13

A 1 liter, 4-neck, round bottom flask was equipped with a mechanical stirrer, an addition funnel, a nitrogen purge, a thermometer, a monomer addition line, a Dean-Stark trap, and a condenser. To the flask was charged 672 g (.6 moles) of surfactant alcohol (Macol CSA-20 Mazer Chemical) and 90 mL of methyl amyl ketone (MAK). The flask contents were heated to reflux to azeotropically dry the alcohol. After water evolution had ceased the alcohol was cooled to 135° C. while the Dean-Stark trap was emptied of solvent and water. Once at 135° C. a solution of 92 g (6 moles) of methacrylic anhydride, 62 g (.6 moles) of styrene, and 2.0 g of di-t-butyl peroxide was fed into the flask through the monomer addition line. Concurrently a solution of 24 g (0.12 moles) of n-DDM in 20 mL of MAK was fed to the flask through the addition funnel. The two additions occurred over 90 minutes. The solution was then held at 135° C. for 30 minutes and then heated to 170° C. to complete the esterification. The flask was heated for an additional 120 minutes and then the temperature was raised to 195° C. for 100 minutes. Titration of the resulting material indicated the anhydride esterification had only gone to approximately 70% completion. The monomer composition of the resulting copolymer is summarized in Table 3.

EXAMPLES 14-15

The process of Example 13 was repeated except that the monomer composition was varied as shown in Table 3. In Example 14 the proportion of styrene to the anhydride was increased, and in Example 14 maleic anhydride was substituted for methacrylic anhydride and ethyl acrylate was charged with the methacrylic acid. In either case esterification of the surfactant alcohol could not be taken to 100% completion.

TABLE 3

| | Example | | |
|---|---|---|---|
| | 13 | 14 | 15 |
| styrene | 62 g | 137 g | 62 g |
| anhydride | 92 g MAAn[1] | 37 g MAAn[1] | 24 g MAn[2] |
| surfactant alcohol[3] | 672 g | 269 g | 269 g |
| EA[4] | none | none | 72 g |
| n-DDM | 24 g | 24 g | 24 g |

[1]MAAn = methacrylic anhydride
[2]MAn = maleic anhydride
[3]Macol ® CSA-20
[4]EA = ethyl acrylate

EXAMPLES 16-21

Example 16 was prepared by a process analogous to that of Example 1. Example 17 was prepared by a similar process except that 116.5 parts of Macol CSA 20 and 198 parts of Macol CSA 40 were substituted for the 233 parts of Macol CSA 20 used in the process of Example 1. Example 18 was prepared by the process of Example 1 except that 396 parts of Macol CSA 40 were substituted for the 233 parts of Macol CSA 20. Similarly, the process of Example 1 was used to prepare Example 19 except that 20 parts of n-dodecyl mercaptan (DDM) were substituted for the 3-mercaptopropionic acid. Example 20 was prepared according to the process used to prepare Example 19, except that 24 parts of butyl acrylate and 85.7 parts of acrylic acid were substituted for 100 parts of acrylic acid. Example 21 was prepared by a process similar to the process of Example 1, except that 549 parts of Macol CSA 20 were used and 36.9 parts of trimethylolpropane trimercaptopropionate were substituted for 3-mercaptopropionic acid.

The monomer composition of Examples 16-21 is summarized in Table 4.

TABLE 4

| Example | Surfactant[1] Alcohol | AA[2] | BA[3] | Mercaptan[4] |
|---|---|---|---|---|
| 16 | CSA(EO)$_{20}$/[5] | 14 | 0 | MPA/[6] |
| 17 | CSA(EO)$_{20}$/ +CSA(EO)$_{40}$/[7] | 14 | 0 | MPA/ |
| 18 | CSA(EO)$_{40}$/ | 14 | 0 | MPA/ |
| 19 | CSA(EO)$_{20}$/ | 14 | 0 | /[8] |
| 20 | CSA(EO)$_{20}$/ | 12 | 2 | / |
| 21 | CSA(EO)$_{20}$/ | 5.3[9] | 0 | TMPTMP/[10] |

[1]Type and number of moles of surfactant alcohol
[2]Moles of acrylic acid
[3]Moles of butyl acrylate
[4]Type and number of moles of mercaptan chain transfer agent
[5]CSA(EO)$_{20}$ = Macol ® CSA-20
[6]MPA = 3-mercaptopropionic acid
[7]CSA(EO)$_{40}$ = Macol ® CSA-40
[8]DDM = n-dodecyl mercaptan
[9]Indicates five moles of acrylic acid per each of the three mercaptan groups of the chain transfer agent.
[10]TMPTMP = trimethylolpropane trimercaptopropionic acid

EXAMPLE 22

To a 2 liter round bottom flask equipped with a mechanical stirrer, a condenser arranged for reflux, a thermometer and inlets for the gradual addition of monomers, mercaptan and initiator is added 130 g of Macol ® LA-23 [(C$_{12}$alkoxy(ethyleneoxy)$_{23}$-ethanol)]. Heat is supplied by a heating mantle. The alcohol was heated to 150° C. A mix consisting of 344 g of styrene, 145 g of acrylic acid, and 5 g of t-butyl perbenzoate was prepared. Twenty-four grams of 3-mercaptopropionic acid is weighed out as a chain transfer agent. The monomer mix and the mercaptan solution were added linearly and separately over 120 minutes. The temperature is maintained at 150° C. for 30 minutes after the monomer addition is complete. The material produced by the process is poured on aluminum foil at 150° C. and isolated as a brittle solid at room temperature.

EXAMPLE 23

The process of Example 22 was repeated, except that the amount of styrene used was reduced from 355 g to 300 g and the amount of acrylic acid was raised from 145 g to 200 g.

EXAMPLE 24

The process of Example 23 was repeated except that polyethylene glycol methyl ether (molecular weight 1900) was substituted for the Macol®LA-23.

The process of Example 22 was repeated except that Pluronic® (trademark of BASF Wyandotte) L-35 [poly(ethyleneoxy)-poly(propyleneoxy)-poly(ethyleneoxy) tri-block copolymer—molecular weight about 950] was substituted for the Macol®LA-23.

Polymeric compositions prepared according to the process of the present invention, as exemplified above, are useful in a wide variety of applications, as shown by the following application examples.

EXAMPLE A—LIMESOAP DISPERANCY

Using the procedures given in JOACS 21 (1950) 88, the limesoap disperancy of copolymers of the present invention was measured and compared with that of acrylic acid homopolymers (Comparative Examples 1–3) and copolymers of acrylic acid and half-esters of polyethylene glycol and methacrylic acid. (U.S. Pat. No. 3,719,647—Comparative Examples 4 and 5). The results given in Table I indicate that the copolymers of the present invention are superior to both acrylic acid homopolymers and the copolymers of U.S. Pat. No. 3,719,647 in limesoap dispersancy, an important requirement for detergent compositions used in hard water laundering.

TABLE I

| Example or Comparative Ex. | Polymer Composition | Polymer Molecular Weight | Lime Soap Disperancy |
|---|---|---|---|
| Comp. Ex. 1[2] | AA | 4500 | 20 |
| Comp. Ex. 2 | AA | 1000 | 40 |
| Comp. Ex. 3 | AA | 10000 | 15 |
| Comp. Ex. 4 | AA/(PEG 3400) | | 12.5 |
| Comp. Ex. 5 | AA/(PEG 1000) | | 11.5 |
| Ex. 1 | AA/(20 EO/ 16–18 C)[2] | 3700 | 0.8 |
| Ex. 2 | AA/(20 EO/ 16–18 C) | 3000 | 0.9 |

TABLE I-continued

| Example or Comparative Ex. | Polymer Composition | Polymer Molecular Weight | Lime Soap Disperancy |
|---|---|---|---|

[1]Comparative Examples 1–3 are acrylic acid homopolymers prepared by a standard aqueous process employing chain transfer agents to provide low molecular weight polymer.
[2]The notation indicates the number of ethylene oxide units in the poly(ethyleneoxy)-ethanol segment and the number of carbon atoms in the alkyl segment of the ester.

EXAMPLE B—ANTIDEPOSITION WITH LIQUID DETERGENT

A soil antideposition test was conducted using the protocol of ASTM method D 4008-81 except that 50 g of a commercial detergent solution (4.0% w/w) and 50 g of the polymer solution (0.080% w/w) were added to the Terg-O-Tometer test pots for each test. The commercial detergent was a household liquid detergent containing "cleaning agents (anionic, nonionic and cationic surfactants, enzymes), water softeners (laurate, citrate), dispensing aids (ethyl alcohol, propylene glycol), buffering agents, water, stabilizing agents, soil suspending agent, fabric whiteners, colorant and perfume." The results of the tests are reported in Table II, and show that the water soluble polymer of the present invention improves the soil antideposition properties of commercially available household liquid laundry detergents. In addition, the improvement for cotton fabric is unexpectedly greater than that obtained either by use of polyethylene glycol, additional anionic or nonanionic surfactants or alkoxypolyethyleneoxyethanol.

TABLE II

| Examples or Comparative Ex. | Polymer Composition | Polymer Molecular Weight | % Soil Antideposition (3 cycles) | |
|---|---|---|---|---|
| | | | % Reflectance on Cotton[1] (ave) | % Reflectance on PE:cot[2] (ave) |
| No polymer | | | 78.0 | 98.6 |
| — | (20 EO/16–18C)[3] | 1237 | 79.6 | 99.5 |
| — | (7 EO/12–15C)[4] | 522 | 78.2 | 98.7 |
| — | PEG[5] | 8000 | 79.4 | 99.1 |
| — | $C_{18}H_{29}SO_3$—$Na^{+}$[6] | 348 | 77.2 | 98.4 |
| Ex. 32[1] | AA/(20 EO/16–18C) | 3700 | 83.9 | 98.7 |

[1]100% cotton oxford broad cloth.
[2]50/50 polyester/cotton blend cloth.
[3]Macol ® (trademark of Mazer Chemicals) CSA-20 - ($C_{16}$–$C_{18}$)alkoxy(ethoxy)$_{19}$ ethanol.
[4]Neodol ® (trademark of Shell Chemical Co.) 25-7 - ($C_{12}$–$C_{15}$)alkoxy(ethoxy)$_6$ ethanol - nonionic surfactant.
[5]Carbowax ® (trademark of Union Carbide Corp.) 8000 - polyethylene glycol.
[6]sodium lauryl sulfate - anionic surfactant.

EXAMPLE C—FOAM STABILITY OF HAND DISHWASHING DETERGENTS

The effect of addition of a copolymer of the present invention on the foam stability of hand dishwashing detergents was measured employing the procedure of R. M. Anstett and E. J. Schuck, J.A.O.C.S (Journal of the American Oil Chemists Society) (October 1966), Volume 43, pages 576–580.

The results reported in Table III indicate that a water soluble polymer of the present invention enhances the cleaning performance of hand dishwashing detergents as measured by the foam stability. It should be noted that the addition of polymer increases the solids by approximately 13%, but the performance with polymer addition is increased about 50%.

TABLE III

| Polymer[1] Example | #3 Plate Units | #1 Plate Units | Total Plates |
|---|---|---|---|
| No polymer | 2 | 4 | 10 |
| No polymer | 2 | 3 | 9 |
| 1 | 4 | 3 | 15 |
| 1 | 3 | 5 | 14 |

[1]Polymer was used at a 5% level based on the weight of the detergent, which was a commercial product containing biodegradable surfactants and no phosphorus, and having 39.3% solids.

EXAMPLE D—HARD SURFACE CLEANING—MACHINE DISHWASHING

The effect of a copolymer of the present invention on the performance of machine dishwashing detergents was studied using a modification of ASTM Test Method D 3556-85, "Deposition on Glassware during Mechanical Dishwashing." The modifications of the test method were to use a higher soil loading, 60 g instead of the 40 g specified under the procedure, and to wash the ware under a 'short' dishwashing machine. This provides a 25 minute wash, a 2 minute rinse and an 8 minute rinse. The test conditions were: 54° C., 200 ppm hardness as $CaCO_3$ (hard water) and 37.5 g of liquid detergent (Cascade ®—trademark of Procter and Gamble). The polymer which was used was like Example 1, with a composition of about 30% acrylic acid and 70% of a cetyl/stearyl alcohol with 40 moles of ethylene oxide, Mn of about 3700. This was used at a 2% level on the detergent.

The results given in Table IV after one cycle show the advantage of the polymer of the present invention in the detergent with the glass ratings in spotting. The rating system is similar to the test method: 0 - no spots, 1 - spots barely perceptible, 2 - slight spotting, 3-50% of the glass is covered with spots, and 4 - the whole glass is covered with spots.

TABLE IV

| Spotting on glass # | | | | |
|---|---|---|---|---|
| 1 | 2 | 3 | 4 | Grease Deposition |
| Cascade ® detergent alone | | | | |
| 2 | 2 | 2 | 2 | 2 |
| Cascade ® detergent with 5% Polymer added | | | | |
| 1 | 1 | 1 | 1 | 1 |

EXAMPLE E—CALCIUM CARBONATE INHIBITION

Using the procedure given in U.S. Pat. No. 4,326,980, inhibition of calcium carbonate formation by polymers of the present invention was measured. The results given in Table V show that a polymer of the present invention is effective in inhibiting the formation of calcium carbonate, a useful property in both detergent and water treatment applications.

TABLE V

| Example or Comparative Ex. | Polymer Composition | Polymer Molecular Weight | % Inhibition 2.5 ppm | 5 ppm | 10 ppm |
|---|---|---|---|---|---|
| Comp. Ex. 5 | AA/(PEG 1000) | | 58.5 | 72.7 | 82.1 |
| Comp. Ex. 6 | AA | 2000 | 73.2 | 86.3 | 95.8 |
| — | Polymaleic[1] acid | 1000 | 66.9 | 77.9 | 84.8 |
| — | ATMP[2] | 299 | 79.5 | 82.1 | 81.6 |

TABLE V-continued

| Example or Comparative Ex. | Polymer Composition | Polymer Molecular Weight | % Inhibition 2.5 ppm | 5 ppm | 10 ppm |
|---|---|---|---|---|---|
| Ex. 1 | | 370 | 27.9 | 51.2 | 64.2 |

[1]Belclene ™ (trademark of Ciba-Geigy) 200 - polymaleic acid.
[2]Dequest ™ (trademark of Monsanto) 2000 aminotri(methylenephosphonic acid).

EXAMPLE F—INHIBITION OF BARIUM SULFATE FORMATION

The efficiency of polymers of the present invention in inhibiting the formation of barium sulfate was evaluated using the following procedure:

The following solutions were prepared:

| Formation Water | Sea Water* |
|---|---|
| 74.17 g/l NaCl | 23.955 g/l NaCl |
| 10.31 g/l $CaCl_2.2H_2O$ | 1.57 g/l $CaCl_2.2H_2O$ |
| 4.213 g/l $MgCl_2.6H_2O$ | 11.4362 g/l $MgCl_2.6H_2O$ |
| 0.709 g/l KCl | 0.8771 g/l KCl |
| 1.747 g/l $SrCl_2.6H_2O$ | 0.0243 g/l $SrCl_2.6H_2O$ |
| 0.448 g/l $BaCl_2.2H_2O$ | 4.3769 g/l $Na_2SO_4$ |
| 0.0170 g/l $Na_2SO_4$ | 0.1707 g/l $NaHCO_3$ |
| 0.638 g/l $NaHCO_3$ | |

*Filtered through a 0.45 um filter

The pH of formation water and sea water were adjusted to pH 6 by bubbling nitrogen (to raise pH) or carbon dioxide (to lower pH) through the solutions. The pH of another sample was adjusted to 4 with carbon dioxide and concentrated HCl. For each test sample, the following compounds were placed in a clear 4 oz. jar:

1. Polymer dosage (1.3 ml of 0.1% polymer solution at pH 6)
   (3.9 ml of 0.1% polymer solution at pH 4)
2. 50 ml sea water (mix)
3. 50 ml formation water (mix)

The samples were placed in an oven at 90° C. for 15 hours, then filtered while hot through a 0.45 um filter. The filtered samples were analyzed for Ca by EDTA titration and Ba and Sr by atomic absorption. Percent inhibition was calculated as follows.

$$\% \text{ inhibition} = \frac{(M)\text{sample} - (M)\text{blank}}{(M)100\% \text{ inhibition} - (M)\text{blank}} \times 100$$

| Ion | Dilution | |
|---|---|---|
| Ca, Sr | 1.5 ml | 100 ml total |
| Ba | 6.0 ml | 100 ml total |
| 100% Inhibition (calculated) | | |
| Ba | 126 ppm Ba-214 ppm as $BaSO_4$ | |
| Sr | 291 ppm Sr | |
| Ca | 4043 ppm Ca as $CaCO_3$ | |

The results reported in Table VI show that copolymer of the present invention is effective in preventing the formation of barium sulfate under conditions encountered in oil wells. The polymers of the present invention are believed to be especially useful in carbon dioxide oilfield flooding and other oil recovery applications where the pH is low (e.g., around 4). Further, the polymers of the present invention are believed useful in redispersing barium sulfate in oil wells sealed with "scale" containing barium sulfate.

TABLE VI

| Example | Polymer Composition | Polymer Molecular Weight | % BaSO₄ Inhibition | | | |
|---|---|---|---|---|---|---|
| | | | pH 4 | | pH 6 | |
| | | | 30 ppm | 90 ppm | 10 ppm | 30 ppm |
| | no polymer | | 1 | | 0 | |
| Comp. Ex. 5 | AA/(PEG 1000) | — | 5 | — | — | 3 |
| Comp. Ex. 6 | AA | 4500 | 4 | — | 17 | 65 |
| Comp. Ex. 7 | AA | 2000 | 4 | 7 | 6 | 35 |
| Comp. Ex. 8 | AA/MAA[1] | 3500 | 7 | 9 | 3 | 45 |
| | DETPMP[2] | | 9 | 17 | 7 | 43 |
| Comp. Ex. 9[3] | poly(phosphino acrylic acid) | | 9 | — | — | — |
| Comp. Ex. 10[4] | polystyrene sulfate | | 8 | — | — | — |
| Comp. Ex. 11 | AA/MAA[1] | | 7 | — | — | — |
| Comp. Ex. 12 | AA | | 5 | — | — | — |
| Ex. 1 | AA/(20EO/16-18C) | 3700 | 5 | — | — | 9 |

[1]acrylic acid/methacrylic acid copolymer.
[2]Dequest ™ (trademark of Monsanto) 2060 - diethylene triamine pentamethylene phosphonic acid.
[3]Belsperse ™ (trademark of Ciba-Geigy) 161 - poly(phosphino acrylic acid).
[4]Versa ™ (trademark of National Starch) TL-77 - polystyrene sulfonate.

Another unexpected and advantageous property of the polymeric compositions prepared according to the process of the present invention is the enhanced biodegradablity of the compositions of this invention in comparison with polyacid-type polymers. This is an especially important property when the polymeric compositions are use in detergent formulations as builder or additives. For example, the polymer of Example 1 was degraded by 12% by weight, and the polymer of Example 16 was degraded by 14% by weight, as measured by five day BOD tests, compared with less than 2% degradation for polyacids of similar molecular weight.

EXAMPLE G—USE AS AN ASSOCIATIVE THICKENER; EFFECT OF CROSSLINKER LEVEL

A series of semigloss paints were prepared as follows:
The following ingredients were added to a stainless steel mixing vessel to form a mixture:

| | Parts By Weight | Parts By Volume |
|---|---|---|
| propylene glycol | 70.0 | 8.14 |
| Tamol ® (trademark of Rohm and Haas Co.) SG-1 (35% w/w solids aqueous dispersion) | 12.0 | 1.25 |
| Foamaster ® (trademark of Diamond Shamrock) VL defoamer | 1.0 | 0.13 |
| water | 45.0 | 5.40 |

The following ingredients were added while the mixture was ground at low speed in a Cowless disperser (impeller mill):

| | | |
|---|---|---|
| TiPure ® (trademark of Du Pont de Nemours Co.) R-900 titanium dioxide | 210.0 | 6.05 |
| ASP (trademark of Englehard Minerals and Chemicals) 170 - china clay | 88.0 | 4.09 |

The mix was ground at high speed (3800–4500 FPM) for 20 minutes, and let down at low speed with the following:

| | | |
|---|---|---|
| water | 115.7 | 14.00 |
| Texanol ® (trademark of Eastman Kodak Co.) 2,2,4-trimethyl-1,3-pentanediol monoisobutyrate - coalescent | 11.4 | 1.44 |
| Nuosept ® (trademark of Nuodex Inc.) 95 - preservative | 2 | 0.06 |
| Rhoplex ® (trademark of Rohm and Haas Co.) AC-64 acrylic latex trade sales binder (60.5% w/w solids) | 378.0 | 42.71 |
| Foamaster VL | 3.0 | 0.41 |
| water | 42.0 | 5.04 |
| ammonium hydroxide[1] (28% w/w aqueous) | 1.8 | 0.23 |
| associative thickener (as 30% w/w aqueous dispersion) premix[2] | 30.0 | 3.39 |
| water | 55.0 | 6.60 |
| ammonium hydroxide[3] (28% w/w aqueous) | 8.3 | 1.00 |
| | 1073.2 | 100.00 |

[1]pH adjusted to 9.5 before thickener addition.
[2]Stormer viscosity adjusted to 80 ± K.U.
[3]Final pH adjusted to 8.4 ± 0.2.

The paints had the following formulation properties

| | |
|---|---|
| PVC | 29.3% |
| Volume Solids | 34.6% |
| Initial Viscosity | 80 ± 6 K.U. |
| Equilibrated Viscosity | 99 ± 7 K.U. |
| Hand Stirred | 83 ± 7 K.U. |
| Sheared ICI Viscosity | 1.5 ± 0.2 poise |
| pH | 8.4 ± 0.2 |
| Gloss: | |
| 20° | 6 ± 2 |
| 60° | 45 ± 5 |
| CARB (organic volatiles) | 213 g./l. |

The paints were thickened with associative thickeners prepared according to the process of the present invention. The paints had high shear rate (ICI) and low shear rate (KU) viscosities, and heat age stabilities given in Table VII which also includes data for semi-gloss paints prepared using the same formulation but thickened by a non-associative, conventional hydroxyethyl cellulose thickener or commercially available associative thickener. The early blister resistance of the coatings formed by the paints was measured as follows:

Two coats of the test paint were applied, by brush, to a chalky acrylic substrate with a 5 hr. dry period between coats under controlled humidity and temperature conditions (constant temperature room, 75° F., 50 % relative humidity). The painted substrates were then allowed to dry overnight under these conditions. The substrates were then placed in a fogbox (fine water spray) and the size and density of blisters in the paint film were rated against the ASTM D-714-56 pictoral standards as a function of exposure time.

The heat age stability of the paints as evaluated at 140° F. for 240 hours.

The viscosity stability upon colorant addition was measured as follows:

The change in KU viscosity of the test paint was observed after the addition of the equivalent of 8 oz. of pthalo blue universal colorant per 100 gal. of paint.

Table VII gives the results of the early blister resistance and colorant sensitivity tests the data and show that the thickener compositions prepared by the process of the present invention offer early blister resistance that is superior to HASE (hydrophobe-alkali soluble emulsion) thickeners (e.g. RM-5) while providing colorant sensitivity that is superior to the current urethane technology.

TABLE VII

| Example | Thickener Level[1] | Viscosity KU[2] | ICI[3] | Heat-age Stability[4] | Early Blister Resistance[5] | Colorant Sens.[6] |
|---|---|---|---|---|---|---|
| 3 | 11.4 | 86 | 0.6 | −5/−13 | 9md/8md/7d | −12 |
| 4 | 14.0 | 85 | 0.6 | −8/−16 | 9md/8md/7d | −11 |
| 5 | 11.7 | 86 | 0.6 | −5/−16 | 9md/8md/7d | −6 |
| 6 | 13.7 | 86 | 0.6 | −5/−21 | 9md/8md/6d | −8 |
| 7 | 12.7 | 86 | 0.6 | −5/−19 | 9md/8md/6d | −5 |
| Acrysol ®[7] TT-935 | 3.0 | 88 | 0.7 | −11/−10 | 6m/4m/4md | −10 |
| Acrysol ®[8] QR-708 | 3.0 | 86 | 0.7 | +2/0 | 8md/7md/7md | −22 |
| Acrysol ®[9] RM-5 | 9.0 | 88 | 1.9 | 0/−3 | 4d/3d/2d | −4 |
| HEC | 4.1 | 81 | 0.5 | +4/+1 | 10/10/10 | −5 |

[1]Weight ratio of thickener to total paint solids.
[2]Low shear rate viscosity in Krebs units measured using a Krebs-Stormer viscometer.
[3]High shear rate viscosity in poise measured using an ICI cone-and-plate viscometer.
[4]Heat-age stability of paint measured by change in KU viscosity.
[5]Early blister resistance scale: Compared to ASTM Method D-714-56 photographic standards.
[6]Colorant sensitivity measured by change in KU viscosity.
[7]Acrysol ® (trademark of Rohm and Haas Company) TT-935 is a commercially available associative thickener.
[8]Acrysol ® QR-708 is a commercially available polyurethane type associative thickener.
[9]Acrysol ® RM-5 is a commercially available rheology modifier.
[10]HEC - hydroxyethyl cellulose.

EXAMPLE H—PIGMENT DISPERSION

Polymers prepared by the process of the present invention were used as pigment dispersants in latex paint compositions. The paints, which had 33% volume solids (VS) and 20% pigment volume concentration (PVC) were prepared as follows:

A pigment grind was prepared by grinding the following materials at high speed using a Cowles dispenser:

| | Parts By Weight | Parts By Volume |
|---|---|---|
| water | 72.5 | 8.70 |
| propylene glycol | 48.7 | 5.60 |
| Colloid ® (trademark of Colloids, Inc.) 643 - defoamer | 0.8 | 0.10 |
| TiPure ® R-902 titanium dioxide | 227.4 | 6.64 |

7.78 parts by weight (0.91 parts by volume) of 30% w/w aqueous dispersion of a polymeric compositions prepared according to the process of the present invention and which was to be evaluated as a pigment dispersant was post-added to the grind to allow evaluation of dispersant effects without confounding with or complication by grinding effects. The grind was let down at low speed with the following materials to form the test paint:

| | Parts By Weight | Parts By Weight |
|---|---|---|
| acrylic latex (48.74% w/w aqueous dispersion of bimodal acrylic latex) | 536.48 | 61.35 |
| Texanol ® | 13.0 | 1.65 |
| Acrysol ® QR-708 | 24.4 | 7.98 |
| water/ammonia[1] | 100.54 | 12.07 |

[1]The paint pH was adjusted to 9 by addition of ammonia.

Physical properties of the paints so prepared are given in Table IX. Roller and brush application of paints can impart shear rates on the order of $10^4 \text{ sec}^{-1}$. ICI viscosity measurement is believed to have some correlation with the paint application properties of film build and brush drag. Hiding (scattering coefficient) was measured using a modification of ASTM D-2805-70 (clear glass with adherent black paper being substituted for the black glass listed in the standard method). The reflectance of dry paint film (0.80±0.03 mil thick) was measured using a Pacific Scientific reflectometer. The results of the paint performance evaluations are also given in Table VIII. The data in Table VIII shows that the polymers prepared by the process of the present invention gave paints which had similar excellent gloss and hiding.

TABLE VIII

| Example | Stormer Viscosity | ICI[1] Viscosity (P) | Brookfield LVT[2] 6/60 Ratio | Gloss[3] 60° | Gloss[3] 20° | Scattering[4] Coefficient |
|---|---|---|---|---|---|---|
| no dispersant | >141 | 2.90 | 4.83 | 17 | 1.2 | Flocculated[5] |
| 16 | 113 | 0.44 | 1.71 | 63 | 18 | 6.46 |
| 17 | 108 | 0.50 | 1.76 | 63 | 16 | 6.61 |
| 18 | 114 | 0.47 | 1.66 | 59 | 14 | 6.36 |
| 19 | 111 | 0.49 | 1.68 | 65 | 19 | 6.60 |
| 20 | 110 | 0.45 | 1.65 | 64 | 18 | 6.61 |
| 21 | 108 | 0.50 | 1.57 | 63 | 17 | 6.75 |

[1] ICI viscosity (high shear rate) measured using an ICI cone-and-plate viscometer at a shear rate of $10^4 sec^{-1}$.
[2] The Brookfield 6/60 Ratio was found by determining the viscosities of the paint at shear rates of 6 $min^{-1}$ and 60 $min^{-1}$ using a Brookfield LVT viscometer and calculating the ratio of the viscosities.
[3] The paint gloss was determined by measuring reflectometer at 60° and 20°.
[4] The scattering coefficient was determined by a modification of ASTM D-2805-70.
[5] The paint containing no pigment dispersant flocculated before the scattering coefficient could be determined.

EXAMPLE I—INK DISPERSION

A clear aqueous solution (I-1) of the polymer produced in Example 22 was prepared by neutralizing a dispersion of 25 g of the polymer in 59.8 g of water with 4.5 g of a 28% w/w aqueous ammonium solution. The solution had a viscosity of 880 cP measured using a Brookfield viscometer (LVT, spindle #3, 60 $min^{-1}$), total solids of 28% and a pH of 8.3. The solution was found to remain clear on storage.

A second aqueous solution (I-2) was prepared using the polymer produced in Example 23 by neutralizing a dispersion of 24 g of the polymer in 49.9 g of water with 6.1 g of a 28% w/w aqueous ammonia solution. The second solution had a viscosity of 1 1660 cp (Brookfield LVT, spindle #3, 60 $min^{-1}$), total solids of 30% w/w and a pH of 8.35. The solution was initially cloudy and formed a slight precipitate with time. A third and a fourth aqueous solution were prepared using the polymers of Examples 24 and 25 respectively. The effect of varying the total solids of the solutions in the viscosity was measured and the results are given in Table IX. These results indicate that the polymers give aqueous solutions which are compatible with the use of the polymers as pigment dispersants.

A pigment grind composition was prepared by mixing 54.27 g of barium lithol red presscake (50% solids), 48.45 g of solution J-1, 0.28 g defoamer and 7.00 g water and grinding in a steel shot mill shaken for one hour. The resulting pigment dispersion had good color strength as determined by visual inspection and showed reasonable viscosity stability as measured by Brookfield viscosity but had a fairly high foam level initially.

A second pigment dispersion was prepared as above but with the substitution of 45.22 g of solution I-2 for the 48.45 g of solution I-1 and the addition of 10.23 g of water instead of 7 g. The resulting pigment dispersion had low foam and formed initially redispersible precipitate. After approximately six days, the dispersion became a thixotrapic gel.

TABLE IX

| Example | Sol'n Solids | Sol'n pH | Brookfield Viscosity[1] at 25° (cps) |
|---|---|---|---|
| 22 | 28.0% | 8.30 | 880.0[2] |
| 22 | 25.0 | 8.30 | 161.0[3] |
| 22 | 20.0 | 8.30 | 23.0[3] |
| 23 | 30.0% | 8.35 | 1660.0[2] |
| 23 | 25.0 | 8.35 | 316.0[3] |
| 23 | 20.0 | 8.35 | 43.5[3] |
| 24 | 30.0% | 8.38 | 214.0[2] |
| 24 | 25.0 | 8.38 | 67.5[3] |
| 24 | 20.0 | 8.38 | 24.5[3] |
| 25 | 30.0% | 8.34 | 390.0[2] |
| 25 | 25.0 | 8.34 | 41.0[3] |
| 25 | 20.0 | 8.34 | 13.0[3] |

[1] Measured using a Brookfield LVT viscometer, shear rate 60 $min^{-1}$.
[2] Spindle #2.
[3] Spindle #3.

EXAMPLE J—LEATHER SYNTAN

The polymer produced by process of Example 1 was evaluated as a syntan for leather. Four pieces of 4.5 oz (about 1.8 mm thickness) blue stock (two hides, each slit from backbone to belly) were placed in a rotating drum and washed for 10 minutes at 35 ° C. in twice their weight of an aqueous float. The work solution was drained and the wet stock was neutralized with an aqueous solution containing 0.5% w/w Neutralizing Agent (BASF) and 0.5% w/w sodium formate by soaking the stock for 60 minutes at 35° C. in an amount of neutralizing solution equal in weight to the blue stock. The pH of the neutralizing solution after draining it from the drum was 3.95. Subsequently, an amount of an aqueous solution equal in weight to the blue stock and containing 6% w/w of 29% solids w/w aqueous solution of a polymer prepared by the process of Example 1 was added to the drum for use as an syntan. The pH was adjusted to 6.0 by addition of aqueous 0.5N NaOH. After 120 minutes at 35° C. a sample of the syntan solution was drained for analysis, and a dye solution was added to the drum The dye solution was prepared by dissolving 25.8 g of Derma orange 2R and 6.5 g NaCl dissolved in 300 g hot (about 60 ° C.) water. The dye solution was added in an amount to give a weight ratio of dye to blue stock of 0.01. After 20 mintues, 14.7 g of formic acid dissolved in 35.3 g water was added to fix the dye and the temperature was raised to 50 ° C. The weight ratio of formic acid to blue stock was 0.005. After 15 minutes the drum was drained. The pH of the drained solution was 3.41. Next, an amount of hot water equal in weight to the blue stock was added to the drum and the stock was Washed for 4 minutes at 50 ° C. The wash water was drained and two pieces of the stock were removed from the drum. Next, the stock remaining in the drum was fat-liquored by adding 2581 g of hot (about 60 ° C.) water containing 39.9 g of Siria TM 21 (trademark of Henkel for a proprietary soap/oil mixture), and 70 g of BZW TM (trademark of Stockahusen Chemical) to the drum. After 60 minutes 9.94 g of formic acid dissolved in 40.0 g water were added as a fixative. After 10 minutes the float (pH=3.10) was drained to give a tanned pelt with a total weight of 3121 g.

The use of a syntan prepared by the process of this invention substantially and unexpectedly increased the dye strength of the tanning process.

Other modifications and variations of the process of the present invention will be readily apparent to those skilled in the art, all within the scope of the appended claims.

We claim:

1. A process for preparing a functionalized polymeric composition, the process comprising
   (a) dissolving at least one polymerizable ethylenically unsaturated functional monomer and at least one chain transfer agent in a solvent, the at least one chain transfer agent including at least one first functional group, the solvent including at least one reactive compound having at least one second functional group, the at least one first functional group being reactive with the at least one second functional group;
   (b) polymerizing the at least one functional polymerizable monomer in the presence of the reactive compound; and
   (c) reacting at least a predetermined proportion of the at least one first functional group with the at least one second functional group to provide functionalized side chains, such that at least some reaction of the at least one first functional group and the at least one second functional group occurs during the polymerization of the polymerizable functional monomer.

2. A process according to claim 1 wherein the first and second functional groups react to form an ester.

3. A process for preparing a functionalized polymeric composition, the polymeric composition including polymer which has functionalized side chains and which is soluble or dispersible in an appropriate fluid medium, the process comprising:
   (a) dissolving at least one polymerizable ethylenically unsaturated functional monomer in a solvent to form a reactive mixture, the functional monomer including at least one first functional group, the solvent including at least one reactive compound having at least one second functional group, the at least one first functional group being reactive with the at least one second functional group, the at least one first functional group being selected from the group consisting of carboxyl, hydroxyl, isocyanato, epoxy, carboxylic ester and amino;
   (b) polymerizing the at least one functional polymerizable monomer in the presence of the reactive compound; and
   (c) reacting by a non-hydrolysis reaction at least a predetermined proportion of the at least one first functional group with the at least one second functional group to provide the functionalized side chains, such that at least some reaction of the at least one first functional group and the at least one second functional group occurs during the polymerization of the polymerizable functional monomer.

4. A process according to claim 3 wherein no substantial reaction of the at least one first functional group and the at least one second functional group occurs before the polymerization of the polymerizable monomer has begun.

5. A process according to claim 4 wherein polymerization of the at least one polymerizable monomer begins before reaction of the at least one first functional group with the at least one second functional group begins.

6. A process according to claim 5 wherein polymerization of the at least one polymerizable monomer is substantially completed before reaction of the at least one first functional group with the at least one second functional group substantially begins.

7. A process according to claim 3 including dissolving at least one polymerizable ethylenically unsaturated nonfunctional monomer in the solvent, the nonfunctional monomer being copolymerizable with the at least one functional monomer and substantially nonreactive with the second function group.

8. A process according to claim 3 wherein the at least one first functional group and the at least one second functional group react in a condensation reaction to yield water.

9. A process according to claim 8 wherein the solvent includes an organic compound which forms an azeotrope with water, and further including distilling the azeotrope from the reaction mixture to remove the water.

10. A process according to claim 9 wherein the organic compound is selected from toluene, xylene, and methyl amyl ketone.

11. A process according to claim 3 wherein the first functional group is a carboxyl group and the second functional group is selected from hydroxyl and primary and secondary amino.

12. A process according to claim 3 wherein the second functional group is carboxyl and the first functional group is selected from hydroxyl and primary and secondary amino.

13. A process according to claim 9 wherein the at least one reactive compound includes both a hydrophobic portion and a hydrophilic portion, the hydrophilic portion including at least one hydroxyl group.

14. A process according to claim 13, the hydrophilic portion further including a poly(alkleneoxy) group, the hydrophobic portion being $(C_1-C_{22})$hydrocarbyl.

15. A process according to claim 3 wherein the polymerizing and reacting steps yield a polymerized reaction product, and further including isolating the polymerized reaction product from the reaction mixture.

16. A process according to claim 3 wherein the polymerizing and reacting steps yield a polymerized reaction product and further including diluting the reaction mixture with at least one 17. A process according to claim 3 wherein the reaction product is soluble or dispersible, and the solvent is selected from water and water-miscible organic cosolvents.

18. A process according to claim 17 wherein the reaction product is soluble or dispersible in a basic solution.

19. A process according to claim 3 further including adding at least one chain transfer agent to the reactive mixture.

20. A process according to claim 19 wherein the chain transfer agent includes at least one second functional group.

21. A process according to claim 20 wherein the first and second functional groups react to form an ester.

22. A process according to claim 20 wherein the chain transfer agent is water-insoluble and includes at least one hydroxyl group.

23. A process according to claim 22 wherein the chain transfer agent is selected from isopropanol, benzyl alcohol, mono ($C_1$-$C_4$)alkyl esters of ethyleneglycol, and mono ($C_1$-$C_4$)alkyl esters of diethylene glycol.

24. A process according to claim 19 wherein the chain transfer agent includes at least one first functional group.

25. A process according to claim 3 wherein at least two functional monomers are dissolved in the solvent, the at least two functional monomers including at least one carboxyl-functional monomer and at least one carboxylic acid ester functional monomer, the at least one reactive compound having at least one second functional group selected from hydroxyl and primary and secondary amino.

26. A process according to claim 3 wherein the at least one first functional group is isocyanto, the at least one second functional group being selected from primary and secondary hydroxyl and primary and secondary amino.

27. A process according to claim 3 wherein the at least one second functional group is isocyanto, the at least one first functional group being selected from primary and secondary hydroxyl and primary and secondary amino.

28. A process according to claim 3 wherein the at least first functional group is epoxy, the at least one second functional group being selected from hydroxy, carboxyl, and tertiary amino.

29. A process according to claim 3 wherein the at least one first functional group is tertiary amino, the at least one second functional group being selected from epoxy, reactive halo group in alkyl halide, and reactive sulfate group in alkyl sulfate.

30. A process according to claim 3 wherein the reactive compound having at least one second functional group is a chain transfer agent.

31. A process according to claim 30 wherein the first and second functional groups react to form an ester.

32. A process according to claim 3 wherein the solvent includes a reactive compound having at least two second functional groups.

33. A process according to claim 3 wherein the reaction of the first functional group with the second functional groups is facilitated by addition of a catalyst.

34. A process for preparing a high solids polymeric composition including a polymer having the formula:

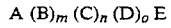

(1) A being the residue of a polymerization or chain transfer agent;
(2) B being the residue of a polymerizable ethylenically unsaturated monomer having at least one first functional group;
(3) C being the residue of the reaction product of a polymerizable ethylenically unsaturated monomer having at least one first functional group and at least one reactive compound having at least one second functional group, the at least one first functional group being reactive with the at least one second functional group;
(4) D being the residue of a polymerizable ethylenically unsaturated monomer which lacks a first functional group;
(5) E being the residue of a polymerizable ethylenically unsaturated monomer;
n being a positive integer, and m and o being nonnegative integers, it being understood that the B, C, and D residues can be arranged in any sequence;

the process comprising:
(a) dissolving at least one polymerizable ethylenically unsaturated functional monomer, and optionally at least one nonfunctional monomer, in a solvent to form a reactive mixture, the functional monomer including at least one first functional group, the solvent including at least one reactive compound having at least one second functional group, the at least one first functional group being reactive with the at least one second functional group;
(b) polymerizing the at least one functional polymerizable monomer, and optionally the at least one nonfunctional monomer, in the presence of the reactive compound and a polymerization initiator or chain transfer agent; and
(c) reacting by a non-hydrolysis reaction at least a predetermined proportion of the at least one first functional group with the at least one second functional group wherein the at least one first functional group is selected from the group consisting of carboxyl, hydroxyl, isocyanato, epoxy, carboxylic ester and amino, to provide functionalized side chains, such that at least some reaction of the at least one first functional group and the at least one second functional group occurs during the polymerization of the polymerizable functional monomer and wherein said polymer produced by said process is water-soluble.

* * * * *